United States Patent
Zhao et al.

(10) Patent No.: US 12,283,883 B2
(45) Date of Patent: Apr. 22, 2025

(54) SERIES-PARALLEL SWITCHED CAPACITOR VOLTAGE CONVERTER

(71) Applicant: Southchip Semiconductor Technology (Shanghai) Co., Ltd., Shanghai (CN)

(72) Inventors: Wei Zhao, Shanghai (CN); Xing Liang, Shanghai (CN)

(73) Assignee: Southchip Semiconductor Technology (Shanghai) Co., Ltd., Shanghai (CN)

( * ) Notice: Subject to any disclaimer, the term of this patent is extended or adjusted under 35 U.S.C. 154(b) by 253 days.

(21) Appl. No.: 17/985,029

(22) Filed: Nov. 10, 2022

(65) Prior Publication Data

US 2023/0155492 A1    May 18, 2023

(30) Foreign Application Priority Data

Nov. 12, 2021 (CN) .......................... 202111337088.2

(51) Int. Cl.
    *H02M 3/07*      (2006.01)
    *H02M 1/00*      (2007.01)
    *H02M 1/08*      (2006.01)

(52) U.S. Cl.
    CPC ........... *H02M 3/07* (2013.01); *H02M 1/0058* (2021.05); *H02M 1/083* (2013.01)

(58) Field of Classification Search
    CPC .............................................. H02M 3/07–073
See application file for complete search history.

(56) References Cited

U.S. PATENT DOCUMENTS

| | | | | |
|---|---|---|---|---|
| 10,797,607 | B2 * | 10/2020 | Rainer | H02M 3/33523 |
| 10,804,798 | B1 * | 10/2020 | Rizzolatti | H02M 3/33573 |
| 11,750,093 | B1 * | 9/2023 | Han | H02M 3/07 363/13 |
| 2019/0348913 | A1 * | 11/2019 | Zhang | H02M 3/07 |
| 2021/0359606 | A1 * | 11/2021 | Han | H02M 1/0054 |
| 2022/0263410 | A1 * | 8/2022 | Saggini | H02M 3/07 |
| 2022/0337078 | A1 * | 10/2022 | Shao | H02M 3/07 |
| 2023/0155478 | A1 * | 5/2023 | Zhao | H02M 3/1582 363/13 |
| 2023/0155491 | A1 * | 5/2023 | Liang | H02M 1/0054 363/13 |
| 2023/0155492 | A1 * | 5/2023 | Zhao | H02M 1/0095 323/235 |

(Continued)

FOREIGN PATENT DOCUMENTS

| | | | | |
|---|---|---|---|---|
| CN | 110165892 | | 8/2019 | |
| CN | 110729888 | A * | 1/2020 | .............. H02M 3/07 |

(Continued)

*Primary Examiner* — Sisay G Tiku

(57) ABSTRACT

A series-parallel switched capacitor voltage converter includes inductive branch, a first branch and a second branch, the inductive branch is connected between the first branch and the second branch. By controlling turning on and off of the switches of the first branch, the second branch and inductive branch, charges on capacitors of one branch are completely transferred to another branch via the inductive branch within a period of time after all main switches of the first branch and the second branch are turned off, and a voltage difference between both terminals of each of the main switches becomes zero, then each of the main switches is started to be turned on, the voltage difference of each of the main switches is zero at an instant when the main switches are turned on.

11 Claims, 19 Drawing Sheets

(56) References Cited

U.S. PATENT DOCUMENTS

| | | | | |
|---|---|---|---|---|
| 2023/0155493 A1* | 5/2023 | Liang | ................... | H02M 3/072 |
| | | | | 323/235 |
| 2023/0155494 A1* | 5/2023 | Zhao | ...................... | H02M 3/07 |
| | | | | 363/13 |
| 2023/0155495 A1* | 5/2023 | Liang | ................. | H02M 3/1582 |
| | | | | 323/235 |
| 2023/0318340 A9* | 10/2023 | Shao | ..................... | H02M 3/07 |
| | | | | 307/23 |
| 2023/0353058 A1* | 11/2023 | Rizzolatti | ............ | H02M 3/155 |

FOREIGN PATENT DOCUMENTS

| | | | | |
|---|---|---|---|---|
| CN | 110729888 | | 11/2020 | |
| CN | 114070041 | | 2/2022 | |
| CN | 115362614 A | * | 11/2022 | ............ H02J 7/0016 |
| EP | 3678288 A1 | * | 7/2020 | .............. H02M 3/07 |
| EP | 4075635 A1 | * | 10/2022 | ............ H02J 7/0013 |

\* cited by examiner

SERIES-PARALLEL SWITCHED CAPACITOR VOLTAGE CONVERTER

CROSS REFERENCE TO THE RELATED APPLICATIONS

This application claims priority to Chinese Patent Application No. 202111337088.2, filed on Nov. 12, 2021, which is hereby incorporated by reference in its entirety.

TECHNICAL FIELD

The present application belongs to the field of switching power supply, and particularly relates to a series-parallel switched capacitor voltage converter.

BACKGROUND

The series-parallel switched capacitor voltage converter has a basic power conversion structure and is widely used in a variety of power management applications to convert one input direct current (DC) voltage to another DC voltage and output.

FIG. 1 shows a conventional two-branch series-parallel 3:1 switched capacitor voltage converter, and in phase 1, in a branch A of a circuit of the two-branch series-parallel 3:1 switched capacitor voltage converter, a first switch transistor Q1A, a fourth switch transistor Q4A, and a seventh switch transistor Q7A are turned on, a second switch transistor Q2A, a third switch transistor Q3A, a fifth switch transistor Q5A and a sixth switch transistor Q6A are turned off, and a first capacitor CF1A and a second capacitor CF2A are connected in series between an input voltage VIN and an output voltage VOUT. When in phase 2, the first switch transistor Q1A, the fourth switch transistor Q4A and the seventh switch transistor Q7A are turned off, the second switch transistor Q2A, the third switch transistor Q3A, the fifth switch transistor Q5A and the sixth switch transistor Q6A are turned on, and the first capacitor CF1A and the second capacitor CF2A are connected in parallel between the output voltage VOUT and ground GND. In the same way, for a branch B of the two-branch series-parallel 3:1 switched capacitor voltage converter, in phase 1, an eighth switch transistor Q1B, an eleventh switch transistor Q4B and a fourteenth switch transistor Q7B are turned off, a ninth switch transistor Q2B, a tenth switch transistor Q3B, a twelfth switch transistor Q5B and a thirteenth transistor Q6B are turned on, and a third capacitor CF1B and a fourth capacitor CF2B are connected in parallel between the output voltage VOUT and the ground GND; when in phase 2, the eighth switch transistor Q1B, the eleventh switch transistor Q4B and the fourteenth switch transistor Q7B are turned on, the ninth switch transistor Q2B, the tenth switch transistor Q3B, the twelfth switch transistor Q5B and the thirteenth switch transistor Q6B are turned off, and the third capacitor CF1B and the fourth capacitor CF2B are connected in series between the input voltage VIN and the output voltage VOUT. Phase 1 and phase 2 work alternately to achieve an output voltage VOUT=VIN/3 and an output current IOUT=3*IIN.

Conversion efficiency is an important index of a switched capacitor voltage converter, the conversion efficiency determines a load capacity and temperature rise of the switched capacitor voltage converter. The higher the conversion efficiency, the greater the load capacity of the switched capacitor voltage converter and the lower the temperature rise. The main losses of the switched capacitor voltage converter come from: 1) Conduction loss of each switch transistor in the circuit; 2) Switching loss when each switch transistor is switched; 3) Driving loss of each switch transistor. A key to improving the conversion efficiency is how to reduce the above-mentioned losses. The switching loss is proportional to the voltage difference between both terminals of each switch transistor when switched respectively, and the greater the voltage difference, the greater the switching loss. Therefore, the current two-branch series-parallel switched capacitor voltage converter has problems of low conversion efficiency and large switching loss, which limits the conversion efficiency of the switched capacitor voltage converters.

SUMMARY

In order to overcome the above-mentioned problems, and particularly to the switching loss, embodiments of the present application provide a series-parallel switched capacitor voltage converter, a voltage difference between both terminals of each switch transistor when switched is decreased to be close to zero or is zero, thereby reducing switching loss and improving conversion efficiency.

An inductor and several switch transistors are added between two branches of a conventional series-parallel switched capacitor voltage converter to obtain the series-parallel switched capacitor voltage converter of the present application, in the series-parallel switched capacitor voltage converter of the present application, by controlling the turning on and off of these switch transistors, an electric charge or electric charges on parasitic capacitors of one branch are completely transferred to another branch via the inductor within a short period of time after all the primary switch transistors are turned off, so that the voltage difference between both terminals of each of the primary switch transistors becomes zero, and then the primary switch transistors are started to be turned on, the voltage difference between both terminals of each of the primary switch transistors is zero at the moment when the primary switch transistors are turned on respectively, thereby reducing the switching loss of the switch transistors and improving the conversion efficiency of the series-parallel switched capacitor voltage converter.

The technical solution of the present application relates to a series-parallel switched capacitor voltage converter, the series-parallel switched capacitor voltage converter is two-branch series-parallel N:1 switched capacitor voltage converter and includes an inductive branch and two branches, N is an integer greater than or equal to 3, the two branches include a first branch and a second branch, and an input voltage, upon travelling via the two branches, is converted into another voltage and output.

The inductive branch is connected between the first branch and the second branch, and switch transistors in the first branch and the second branch are primary switch transistors.

The inductive branch is configured to transfer an electric charge or electric charges on a parasitic capacitors of one branch to another branch of the two branches after all the primary switch transistors are turned off, so that a voltage difference between both terminals of each of the primary switch transistors becomes zero, and then the each of the primary switch transistors is turned on, the voltage difference between both terminals of the each of the primary switch transistors is zero at an instant when the each of primary switch transistors is turned on respectively.

Furthermore, the series-parallel switched capacitor voltage converter is a two-branch series-parallel 3:1 switched capacitor voltage converter, and the first branch includes a first switch transistor, a second switch transistor, a third switch transistor, a fourth switch transistor, a fifth switch transistor, a sixth switch transistor, a seventh switch transistor, a first capacitor and a second capacitor, and the second branch includes an eighth switch transistor, a ninth switch transistor, a tenth switch transistor, an eleventh switch transistor, a twelfth switch transistor, a thirteenth switch transistor, a fourteenth switch transistor, a third capacitor and a fourth capacitor.

A first terminal of the first switch transistor and a first terminal of the eighth switch transistor are connected to an input terminal of the series-parallel switched capacitor voltage converter, and the input terminal is connected to the external input voltage, a second terminal of the first switch transistor is connected to a first terminal of the second switch transistor and a first terminal of the first capacitor, and a second terminal of the eighth switch transistor is connected to a first terminal of the ninth switch transistor and a first terminal of the third capacitor.

A second of the first capacitor is connected to a first terminal of the third switch transistor and a first terminal of the fourth switch transistor, and a second terminal of the third capacitor is connected to a first terminal of the tenth switch transistor and a first terminal of the eleventh switch transistor.

A second terminal of the third switch transistor and a second terminal of the tenth switch transistor are grounded, a second terminal of the fourth switch transistor is connected to a first terminal of the fifth switch transistor and a first terminal of the second capacitor, and a second terminal of the eleventh switch transistor is connected to a first terminal of the twelfth switch transistor and a first terminal of the fourth capacitor.

A second terminal of the second capacitor is connected to a first terminal of the sixth switch transistor and a first terminal of the seventh switch transistor, and a second terminal of the fourth capacitor is connected to a first terminal of the thirteenth switch transistor and a first terminal of the fourteenth switch transistor.

A second terminal of the sixth switch transistor and a second terminal of the thirteenth switch transistor are grounded.

A second terminal of the second switch transistor, a second terminal of the fifth switch transistor, a second terminal of the seventh switch transistor, a second terminal of the ninth switch transistor, a second terminal of the twelfth switch transistor and a second terminal of the fourteenth switch transistor are connected to an output terminal of the series-parallel switched capacitor voltage converter.

Furthermore, the series-parallel switched capacitor voltage converter is a two-branch series-parallel N:1 switched capacitor voltage converter, and the N is an integer greater than or equal to 4.

The first branch comprises a first switch transistor and N−1 first basic units, a first terminal of the first switch transistor is an input terminal of the two-branch series-parallel N:1 switched capacitor voltage converter, the input terminal of the two-branch series-parallel N:1 switched capacitor voltage converter is connected to an external input voltage, a second terminal of the first switch transistor is connected to an output terminal of the two-branch series-parallel N:1 switched capacitor voltage converter through the N−1 first basic units in turn.

Each of the N−1 first basic units comprises an input terminal, a first output terminal and a second output terminal, the second terminal of the first switch transistor is connected to an input terminal of the 1th first basic unit, a first output terminal of each first basic unit is connected an input terminal of the next first basic unit, and a first output terminal of the last first basic unit and respective second output terminals of all the N−1 first basic units are connected to the output terminal of the two-branch series-parallel N:1 switched capacitor voltage converter.

The second branch comprises an eighth switch transistor and N−1 second basic units, a first terminal of the eighth switch transistor is the input terminal of the two-branch series-parallel N:1 switched capacitor voltage converter, a second terminal of the eighth switch transistor is connected to the output terminal of the two-branch series-parallel N:1 switched capacitor voltage converter through the N−1 second basic units in turn.

Each of the N−1 second basic units comprises an input terminal, a first output terminal and a second output terminal, the second terminal of the eighth switch transistor is connected to an input terminal of the 1th second basic unit, a first output terminal of each second basic unit is connected an input terminal of the next second basic unit, and a first output terminal of the last second basic unit and respective second output terminals of all the N−1 second basic units are connected to the output terminal of the two-branch series-parallel N:1 switched capacitor voltage converter.

Furthermore, the each first basic unit comprises a first sub-capacitor, a first sub-switch transistor, a second sub-switch transistor and a third sub-switch transistor, a first terminal of the first sub-capacitor is connected to a first terminal of the first sub-switch transistor, the first terminal of the first sub-capacitor is an input terminal of the first basic unit, and a second terminal of the first sub-switch transistor is a second output terminal of the first basic unit, a second terminal of the first sub-capacitor is connected to a first terminal of the second sub-switch transistor and a first terminal of the third sub-switch transistor, a second terminal of the second sub-switch transistor is connected to the ground, and a second terminal of the third sub-switch transistor is a first output terminal of the first basic unit.

Each second basic unit comprises a second sub-capacitor, a fourth sub-switch transistor, a fifth sub-switch transistor and a sixth sub-switch transistor, a first terminal of the second sub-capacitor is connected to a first terminal of the fourth sub-switch transistor, the first terminal of the second sub-capacitor is an input terminal of the second basic unit, and a second terminal of the fourth sub-switch transistor is a second output terminal of the second basic unit, a second terminal of the second sub-capacitor is connected to a first terminal of the fifth sub-switch transistor and a first terminal of the sixth sub-switch transistor, a second terminal of the fifth sub-switch transistor is connected to the ground, and a second terminal of the sixth sub-switch transistor is a first output terminal of the second basic unit.

Furthermore, the inductive branch includes a fifteenth switch transistor, a sixteenth switch transistor, a seventeenth switch transistor, an eighteenth switch transistor and an inductor. The second terminal of the first capacitor, the first terminal of the third switch transistor and the first terminal of the fourth switch transistor are connected to a first connection node, and the second terminal of the third capacitor, the first terminal of the tenth switch transistor and the first terminal of the eleventh switch transistor are connected to a second connection node, and a first terminal of the fifteenth switch transistor is connected to the first connection node, a second terminal of the fifteenth switch transistor is connected to a first terminal of a sixteenth switch transistor and a first terminal of the inductor, and a second terminal of the sixteenth switch transistor is grounded. A second terminal of the inductor is connected to a first terminal of the seventeenth switch transistor and a first terminal of the eighteenth switch transistor, a second terminal of the seventeenth switch transistor is grounded, and a second terminal of the eighteenth switch transistor is connected to the second connection node.

Furthermore, the inductive branch includes a fifteenth switch transistor, a sixteenth switch transistor, a seventeenth switch transistor, an eighteenth switch transistor and an inductor. The second terminal of the first switch transistor, the first terminal of the second switch transistor and the first terminal of the first capacitor are connected to a first terminal of the fifteenth switch transistor, a second terminal of the fifteenth switch transistor is connected to a first terminal of the sixteenth switch transistor and a first terminal of the inductor, and a second terminal of the sixteenth switch transistor is connected to the input terminal of the series-parallel switched capacitor voltage converter; and the second terminal of the eighth switch transistor, the first terminal of the ninth switch transistor and the first terminal of the third capacitor are connected to a second terminal of the eighteenth switch transistor, a first terminal of the eighteenth switch transistor is connected to a first terminal of the seventeenth switch transistor and a second terminal of the inductor, and a second terminal of the seventeenth switch transistor is connected to the input terminal of the series-parallel switched capacitor voltage converter.

Furthermore, the inductive branch includes a fifteenth switch transistor, a sixteenth switch transistor, a seventeenth switch transistor, an eighteenth switch transistor and an inductor; the second terminal of the first switch transistor, the first terminal of the second switch transistor and the first terminal of the first capacitor are connected to a first terminal of the fifteenth switch transistor, a second terminal of the fifteenth switch transistor is connected to a first terminal of the sixteenth switch transistor and a first terminal of the inductor, and a second terminal of the sixteenth switch transistor is connected to the output terminal of the series-parallel switched capacitor voltage converter; and the second terminal of the eighth switch transistor, the first terminal of the ninth switch transistor and the first terminal of the third capacitor are connected to a second terminal of the eighteenth switch transistor, a first terminal of the eighteenth switch transistor is connected to a first terminal of the seventeenth switch transistor and a second terminal of the inductor, and a second terminal of the seventeenth switch transistor is connected to the output terminal of the series-parallel switched capacitor voltage converter.

Furthermore, a working cycle of the series-parallel switched capacitor voltage converter includes six phases in sequence as follows.

A first phase: the first switch transistor, the fourth switch transistor, the seventh switch transistor, the ninth switch transistor, the tenth switch transistor, the twelfth switch transistor, the thirteenth switch transistor, the sixteenth switch transistor and the eighteenth switch transistor are turned on, and remaining switch transistors are turned off; the input voltage is connected to the output terminal via the first capacitor and the second capacitor respectively, and the third capacitor and the fourth capacitor are connected in parallel between the output terminal and the ground, and the second connection node is connected to the ground via the eighteenth switch transistor, the inductor and the sixteenth switch transistor respectively, and a current on the inductor is 0.

A second phase: the fourth switch transistor, the fifteenth switch transistor and the eighteenth switch transistor are turned on, and remaining switch transistors are turned off; and the first connection node and the second connection node are connected via the fifteenth switch transistor, the inductor and the eighteenth switch transistor respectively, and the current on the inductor continuously increases until to a maximum value, and the second phase ends when the current on the inductor increases to the maximum value.

A third phase: the fifteenth switch transistor and the eighteenth switch transistor are turned on, and remaining switch transistors are turned off, the first connection node and the second connection node are connected via the fifteenth switch transistor, the inductor and the eighteenth switch transistor respectively, and the current on the inductor continuously decreases until to 0, and the third phase ends when the current on the inductor decreases to 0.

A fourth phase: the second switch transistor, the third switch transistor, the fifth switch transistor, the sixth switch transistor, the eighth switch transistor, the eleventh switch transistor, the fourteenth switch transistor, the fifteenth switch transistor and the seventeenth switch transistor are turned on, and remaining switch transistors are turned off; and the first capacitor and the second capacitor are connected in parallel between the output terminal and the ground, the input voltage is connected to the output terminal via the third capacitor and the fourth capacitor respectively, the first connection node is connected to the ground via the fifteenth switch transistor, the inductor and the seventeenth switch transistor respectively, and the current on the inductor is 0.

A fifth phase: the eleventh switch transistor, the fifteenth switch transistor and the eighteenth switch transistor are turned on, and remaining switch transistors are turned off, the first connection node and the second connection node are connected via the fifteenth switch transistor, the inductor and the eighteenth switch transistor respectively, the current on the inductor continuously increases until to a maximum value, and the fifth phase ends when the current on the inductor increases to the maximum value.

A sixth phase: the fifteenth switch transistor and the eighteenth switch transistor are turned on, and remaining switch transistors are turned off, the first connection node and the second connection node are connected via the fifteenth switch transistor, the inductor and the eighteenth switch transistor respectively, the current on the inductor continuously decreases until to 0, and the sixth phase ends and the first phase is started when the current on the inductor decreases to 0.

Furthermore, a working cycle of the series-parallel switched capacitor voltage converter includes six phases in sequence as follows.

A first phase: the first switch transistor, the fourth switch transistor, the seventh switch transistor, the ninth switch transistor, the tenth switch transistor, the twelfth switch transistor, the thirteenth switch transistor, the sixteenth switch transistor and the seventeenth switch transistor are turned on, and remaining switch transistors are turned off, and the input voltage is connected to the output terminal via the first capacitor and the second capacitor in series, the third capacitor and the fourth capacitor are connected in parallel between the output terminal and a ground, and both terminals of the inductor are connected to the ground via the sixteenth switch transistor and the seventeenth switch transistor respectively, and a current on the inductor is 0.

A second phase: the fourth switch transistor, the fifteenth switch transistor and the eighteenth switch transistor are turned on, and remaining switch transistors are turned off, the first connection node and the second connection node are connected via the fifteenth switch transistor, the inductor and the eighteenth switch transistor respectively, the current on the inductor continuously increases until to a maximum value, and the second phase ends when the current on the inductor increases to the maximum value.

A third phase: the fifteenth switch transistor and the eighteenth switch transistor are turned on, and remaining switch transistors are turned off; the first connection node and the second connection node are connected via the fifteenth switch transistor, the inductor and the eighteenth switch transistor respectively, the current on the inductor continuously decreases until to 0, and the third phase ends when the current on the inductor decreases to 0.

A fourth phase: the second switch transistor, the third switch transistor, the fifth switch transistor, the sixth switch transistor, the eighth switch transistor, the eleventh switch transistor, the fourteenth switch transistor, the sixteenth switch transistor and the seventeenth switch transistor are turned on, and remaining switch transistors are turned off; and the first capacitor and the second capacitor are connected in parallel between the output terminal and the ground, the input voltage is connected to the output terminal via the third capacitor and the fourth capacitor in series, both terminals of the inductor are connected to the ground via the sixteenth switch transistor and the seventeenth switch transistor respectively, and the current on the inductor is 0.

A fifth phase: the eleventh switch transistor, the fifteenth switch transistor and the eighteenth switch transistor are turned on, and remaining switch transistors are turned off; the first connection node and the second connection node are connected via the fifteenth switch transistor, the inductor and the eighteenth switch transistor respectively, the current on the inductor continuously increases until to the maximum value, and the fifth phase ends when the current on the inductor increases to the maximum value.

A sixth phase: the fifteenth switch transistor and the eighteenth switch transistor are turned on, and remaining switch transistors are turned off; the first connection node and the second connection node are connected via the fifteenth switch transistor, the inductor and the eighteenth switch transistor respectively, the current on the inductor continuously decreases until to 0, and the sixth phase ends and the first phase starts when the current on the inductor decreases to 0.

The inductor and the several switch transistors are added between two branches of a conventional series-parallel switched capacitor voltage converter to obtain the series-parallel switched capacitor voltage converter of the present application, in the series-parallel switched capacitor voltage converter of the embodiments of the present application, by controlling the turning on and off of these switch transistors, the electric charges on the parasitic capacitors of one branch are completely transferred to another branch via the inductor during the dead time when all the primary switch transistors are turned off, thereby achieving zero voltage switching of all the primary switch transistors.

BRIEF DESCRIPTION OF THE DRAWINGS

To describe the technical solutions in embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DETAILED DESCRIPTION OF THE EMBODIMENTS

To describe the technical solutions in embodiments of the present application more clearly, the following briefly describes the accompanying drawings required for describing the embodiments. It should be noted that, the embodiments of the present application and the features in the different embodiments may be combined with each other under the condition that they do not conflict with each other.

Figure 1:
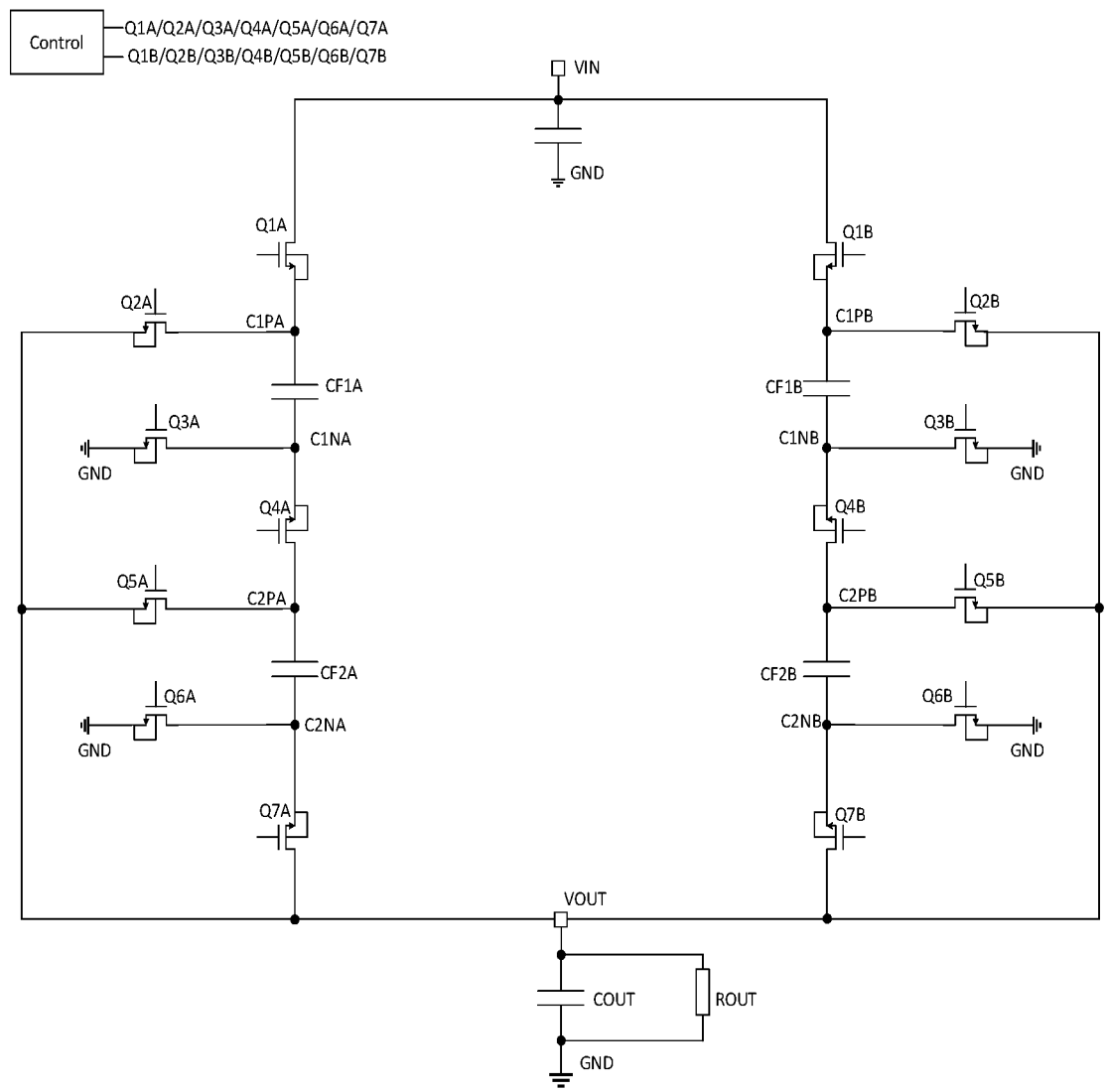
FIG. 1 is a schematic diagram of a circuit structure of a conventional two-branch series-parallel 3:1 switched capacitor voltage converter.
Figure 2:
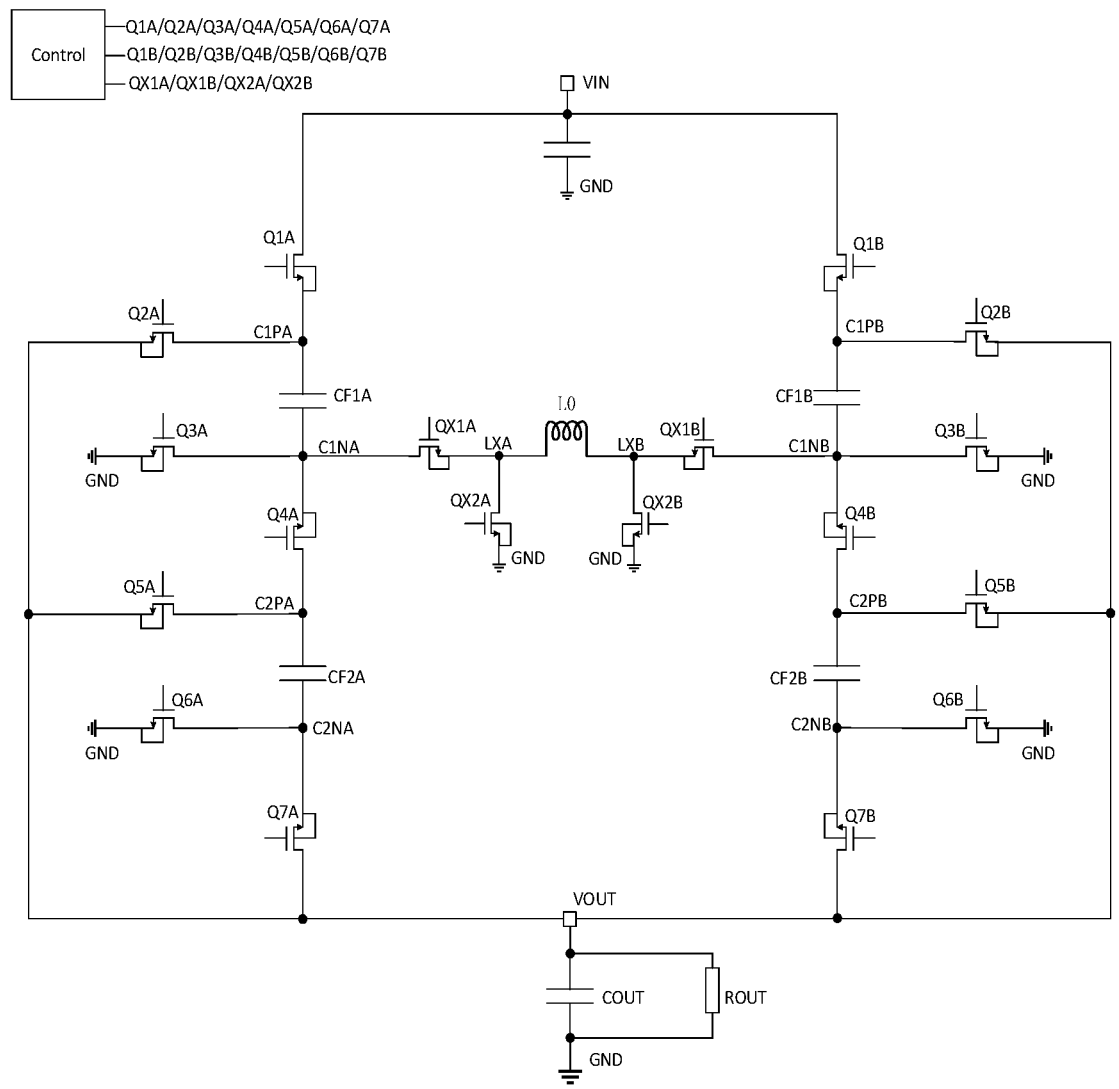
FIG. 2 is a schematic diagram of a circuit structure of a two-branch series-parallel 3:1 switched capacitor voltage converter of an embodiment of the present application.

FIG. 2 shows a circuit of a two-branch series-parallel switched 3:1 capacitor voltage converter, the two-branch series-parallel 3:1 switched capacitor voltage converter includes an inductive branch and two branches, and the two branches include a first branch and a second branch.

The first branch includes a first switch transistor Q1A, a second switch transistor Q2A, a third switch transistor Q3A, a fourth switch transistor Q4A, a fifth switch transistor Q5A, a sixth switch transistor Q6A, a seventh switch transistor Q7A, a first capacitor CF1A and a second capacitor CF2A, and the second branch comprises an eighth switch transistor Q1B, a ninth switch transistor Q2B, a tenth switch transistor Q3B, an eleventh switch transistor Q4B, a twelfth switch transistor Q5B, a thirteenth switch transistor Q6B, a fourteenth switch transistor Q7B, a third capacitor CF1B and a fourth capacitor CF2B. All switch transistors in the first branch and the second branch are primary switch transistors, and each primary switch transistor has a parasitic capacitor. For example, each of the first switch transistor Q1A, the second switch transistor Q2A, the third switch transistor Q3A, the fourth switch transistor Q4A, the fifth switch transistor Q5A, the sixth switch transistor Q6A, the seventh switch transistor Q7A, the eighth switch transistor Q1B, the ninth switch transistor Q2B, the tenth switch transistor Q3B, the eleventh switch transistor Q4B, the twelfth switch transistor Q5B, the thirteenth switch transistor Q6B and the fourteenth switch transistor Q7B has a parasitic capacitor.

An VIN presents an input voltage, the VIN is connected to a ground (GND) via a capacitor CIN, the input voltage VIN is connected to a node C1PA via the first switch transistor Q1A, and the node C1PA is connected to an output voltage VOUT via the second switch transistor Q2A; the node C1PA is connected to a first connection node C1NA via the first capacitor CF1A, the first connection node C1NA is connected to ground GND via the third switch transistor Q3A, the first connection node C1NA is connected to a node C2PA via the fourth switch transistor Q4A, and the node C2PA is connected to the output voltage VOUT via the fifth switch transistor Q5A; the node C2PA is connected to a node C2NA via the second capacitor CF2A, the node C2NA is connected to ground GND via the sixth switch transistor Q6A, and the node C2NA is connected to the output voltage VOUT via the seventh switch transistor Q7A.

Likewise, the input voltage VIN is connected to a node C1PB via the eighth switch transistor Q1B, the node C1PB is connected to the output voltage VOUT via the ninth switch transistor Q2B, the node C1PB is connected to a second connection node C1NB via the third capacitor CF1B, the second connection node C1NB is connected to ground GND via the tenth switch transistor Q3B, and the second connection node C1NB is connected to a node C2PB via the eleventh switch transistor Q4B, the node C2PB is connected to the output voltage VOUT via the twelfth switch transistor Q5B; the node C2PB is connected to a node C2NB via the fourth capacitor CF2B, the node C2NB is connected to ground GND via the thirteenth switch transistor Q6B, and the node C2NB is connected to the output voltage VOUT via the fourteenth switch transistor Q7B.

A capacitor COUT is connected to the output voltage VOUT, and a load resistance ROUT is connected between the VOUT and the GND.

The inductive branch is connected between the two branches of the two-branch 3:1 switched capacitor voltage converter described above, and the inductive branch includes a fifteenth switch transistor QX1A, a sixteenth switch transistor QX2A, a seventeenth switch transistor QX2B, an eighteenth switch transistor QX1B and an inductor L0.

The first connection node C1NA is connected to a node LXA via the fifteenth switch transistor QX1A, the node LXA is connected to ground GND via the sixteenth switch transistor QX2A, the second connection node C1NB is connected to a node LXB via the eighteenth switch transistor QX1B, the node LXB is connected to ground GND via the seventeenth switch transistor QX2B, and the node LXA and the node LXB are connected via the inductor L0.

Figure 3:
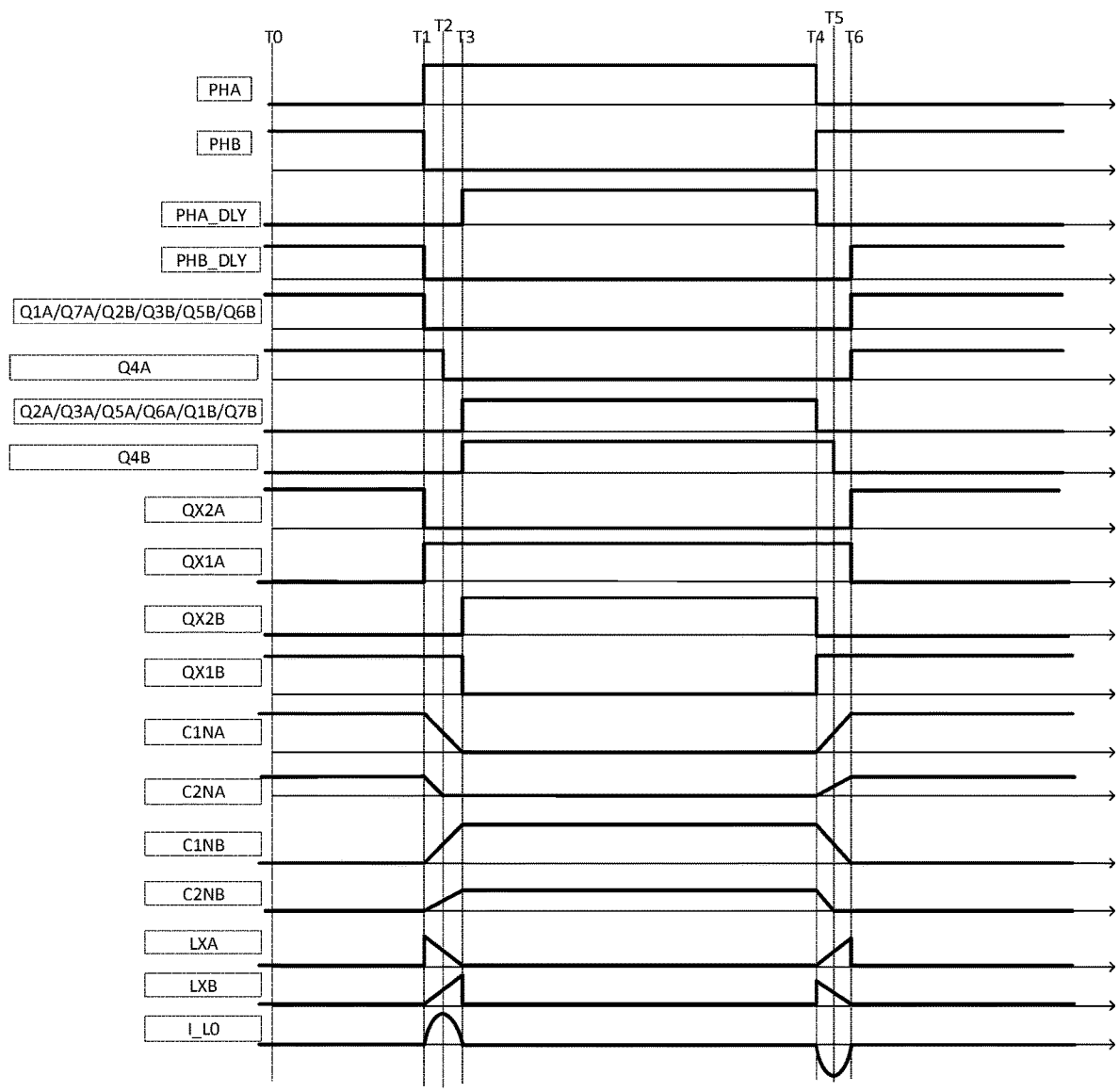
FIG. 3 is a first working cycle diagram of the circuit of the two-branch series-parallel 3:1 switched capacitor voltage converter of an embodiment of the present application.

FIG. 3 shows a first working sequence of a two-branch series-parallel 3:1 switched voltage converter of an embodiment of the present application, there are six working states of phase 1 (T0-T1), phase 2 (T1-T2), phase 3 (T2-T3), phase 4 (T3-T/4), phase 5 (T4-T5) and phase 6 (T5-T6) in sequence within one working cycle. As shown in FIG. 3, voltage patterns corresponding to Q1A, Q2A, Q3A, Q4A, Q5A, Q6A and Q7A present on-off states of the first switch transistor Q1A, the second switch transistor Q2A, the third switch transistor Q3A, the fourth switch transistor Q4A, the fifth switch transistor Q5A, the sixth switch transistor Q6A and the seventh switch transistor Q7A respectively, voltage patterns corresponding to Q1B, Q2B, Q3B, Q4B, Q5B, Q6B and Q7B present on-off states of the eighth switch transistor Q1B, the ninth switch transistor Q2B, the tenth switch transistor Q3B, the eleventh switch transistor Q4B, the twelfth switch transistor Q5B, the thirteenth switch transistor Q6B and the fourteenth switch transistor Q7B respectively, voltage patterns corresponding to QX2A, QX1A, QX2B and QX1B present on-off states of the sixteenth switch transistor QX2A, the fifteenth switch transistor QX1A, the seventeenth switch transistor QX2B and the eighteenth switch transistor QX1B respectively, voltage patterns corresponding to C1NA and C1NB present voltage waveforms of the first connection node C1NA and the second connection node C1NB respectively, voltage patterns corresponding to C2NA and C2NB present voltage waveforms of the node C2NA and the node C2NB respectively, voltage patterns corresponding to LXA and LXB present voltage waveforms of the node LXA and the node LXB respectively, and a current pattern corresponding to I_L0 presents a current waveform of the inductor L0.

Figure 4:
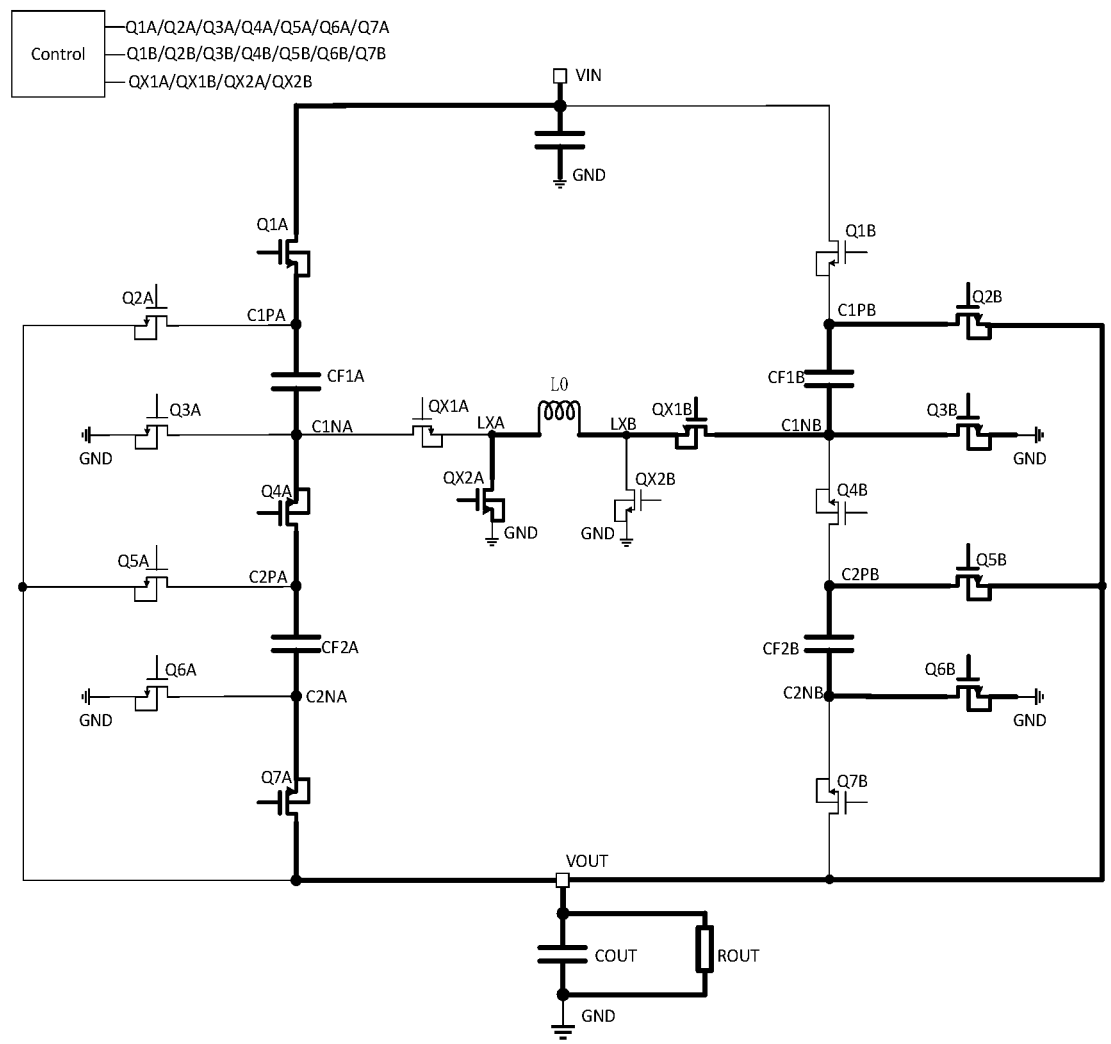
FIG. 4 is a diagram showing a working state of a first phase in the first working cycle as shown in the FIG. 3.

FIG. 4 shows a working state of the series-parallel switched capacitor voltage converter in the phase 1 (T0-T1). In the phase 1, the first switch transistor Q1A, the fourth switch transistor Q4A and the seventh switch transistor Q7A are turned on, the second switch transistor Q2A, the third switch transistor Q3A, the fifth switch transistor Q5A and the sixth switch transistor Q6A are turned off, and the input voltage VIN is connected to the output voltage VOUT via the first capacitor CF1A and the second capacitor CF2A in series. The eighth switch transistor Q1B, the eleventh switch transistor Q4B and the fourteenth switch transistor Q7B are turned off, the ninth switch transistor Q2B, the tenth switch transistor Q3B, the twelfth switch transistor Q5B and the thirteenth switch transistor Q6B are turned on, and the third capacitor CF1B and the fourth capacitor CF2B are connected in parallel between the output voltage VOUT and the ground GND. The sixteenth switch transistor QX2A and the eighteenth switch transistor QX1B are turned on, the fifteenth switch transistor QX1A and the seventeenth switch transistor QX2B are turned off, and the second connection node C1NB is connected to GND via the eighteenth switch transistor QX1B, the inductor L0 and the sixteenth switch transistor QX2A respectively. When phase 6 ends and phase 1 starts, a voltage of the first connection node C1NA is twice the output voltage: 2*VOUT, a voltage of the node C1PA is the input voltage VIN, a voltage of the node C2NA is the output voltage VOUT, a voltage of the node C2PA is twice the output voltage: 2*VOUT, and a voltage difference between both terminals of each of the first switch transistor Q1A, the fourth switch transistor Q4A and the seventh switch transistor Q7A is zero before the first switch transistor Q1A, the fourth switch transistor Q4A and the seventh switch transistor Q7A are turned on respectively, and the respective voltage differences of the first switch transistor Q1A, the fourth switch transistor Q4A and the seventh switch transistor Q7A do not change before and after being switched on and off; a voltage of the second connection node C1NB is zero, a voltage of the node C1PB is the output voltage VOUT, a voltage of the node C2NB is zero, a voltage of the node C2PB is the output voltage VOUT, the voltage difference between both terminals of each of the ninth switch transistor Q2B, the tenth switch transistor Q3B, the twelfth switch transistor Q5B and thirteenth switch transistor Q6B is zero before these switches are turned on respectively, and the respective voltage differences of the ninth switch transistor Q2B, the tenth switch transistor Q3B, the twelfth switch transistor Q5B and thirteenth switch transistor Q6B do not change before and after being switched on and off. In the phase 1, a voltage of first connection node C1NA is equal to twice the output voltage: 2*VOUT, a voltage of the node C2NA is the output voltage VOUT, a voltage of the second connection node C1NB and a voltage of the node C2NB are equal to zero, a voltage of the node LXA and a voltage of the node LXB are equal to zero, and the current of the inductor L0 is zero.

Figure 5:
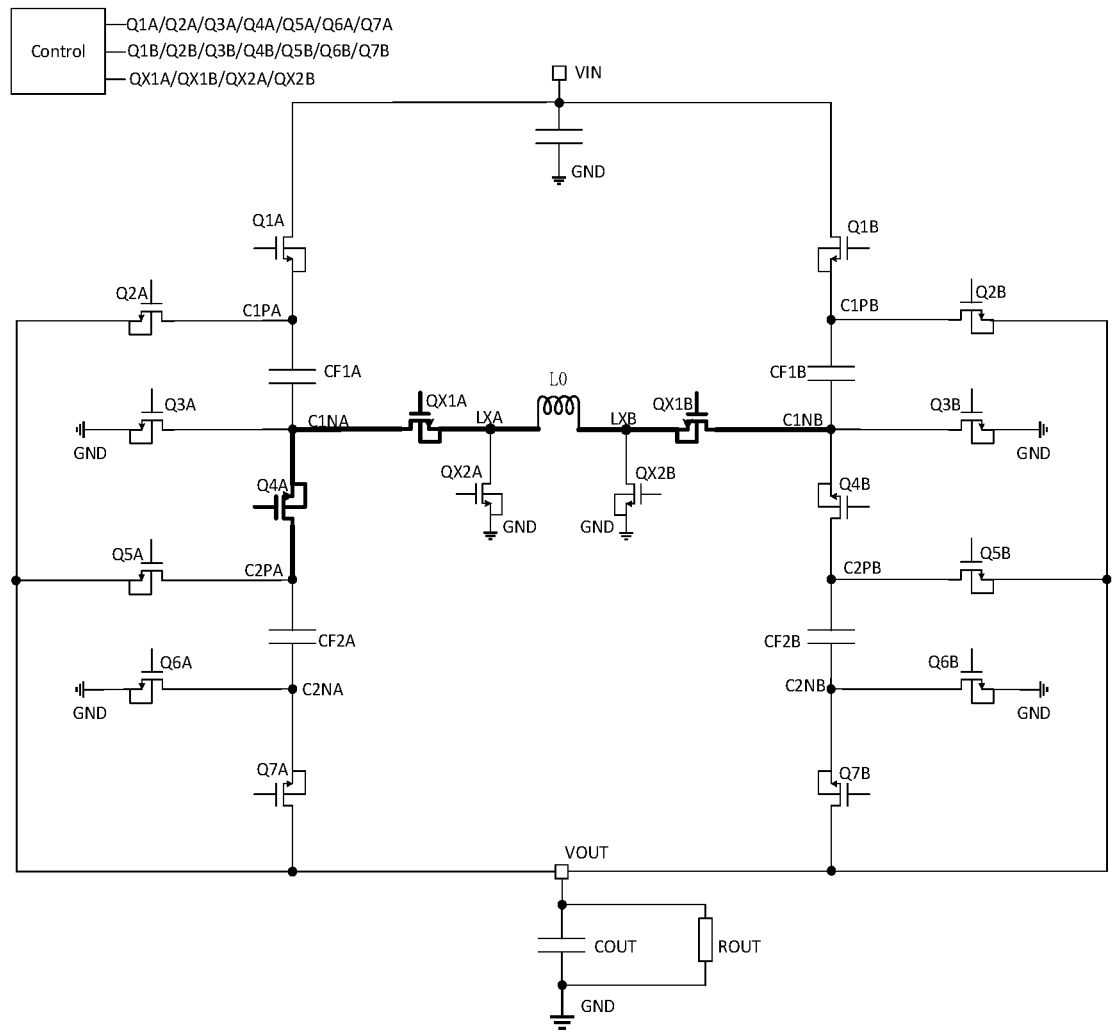
FIG. 5 is a diagram showing a working state of a second phase in the first working cycle as shown in the FIG. 3.

FIG. 5 shows a working state of the series-parallel switched capacitor voltage converter in the phase 2 (T1-T2). The first switch transistor Q1A, the second switch transistor Q2A, the third switch transistor Q3A, the fifth switch transistor Q5A, the sixth switch transistor Q6A and the seventh switch transistor Q7A are turned off, the fourth switch transistor Q4A is turned on, the eighth switch transistor Q1B, the ninth switch transistor Q2B, the tenth switch transistor Q3B, the eleventh switch transistor Q4B, the twelfth switch transistor Q5B, the thirteenth switch transistor Q6B and the fourteenth switch transistor Q7B are turned off, the sixteenth switch transistor QX2A and the seventeenth switch transistor QX2B are turned off, the fifteenth switch transistor QX1A and the eighteenth switch transistor QX1B are turned on, and the first connection node C1NA and the second connection node C1NB are connected via the fifteenth switch transistor QX1A, the inductor L0 and the eighteenth switch transistor QX1B respectively. At the beginning of the phase 2, the voltage of the first connection node C1NA is equal to twice the output voltage: 2*VOUT, the voltage of the node C2NA is equal to the output voltage VOUT, and the voltage of the second connection node C1NB and the voltage of the node C2NB are equal to zero. When the first connection node C1NA and the second connection node C1NB are connected via the inductor L0, the current of the inductor L0 flows from the node LXA to the node LXB and starts to increase, the voltage of the first connection node C1NA and the voltage of the node C2NA continuously decrease, and the voltage of the second connection node C1NB and the voltage of the node C2NB continuously increase. When the both voltages of the first connection node C1NA and the second connection node C1NB are equal to the output voltage VOUT, the current of the inductor L0 reaches a maximum value, and the voltage of the node C2NA decreases to zero, and a controller controls the switch transistors to end the phase 2 state and start the phase 3.

Figure 6:
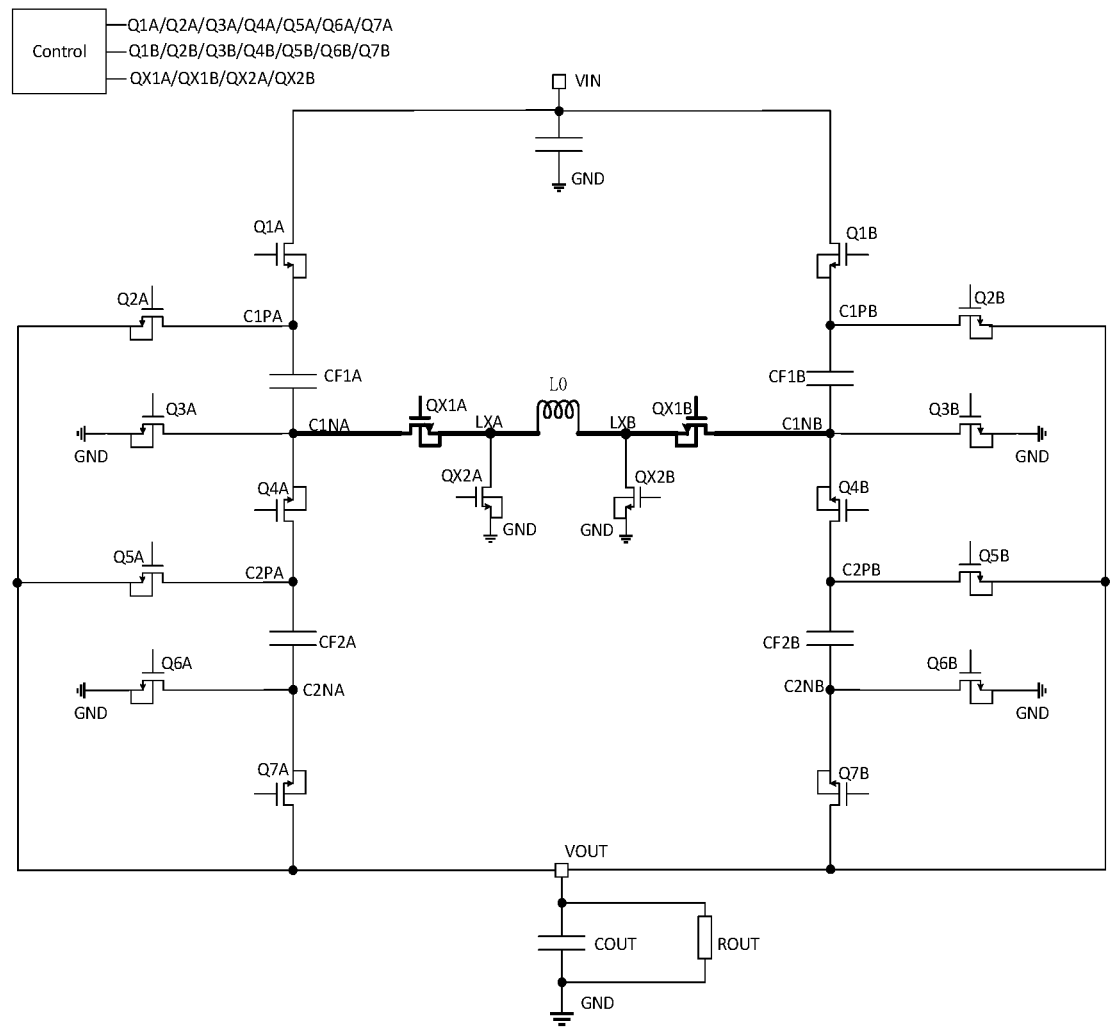
FIG. 6 is a diagram showing a working state of a third phase in the first working cycle as shown in the FIG. 3.

FIG. 6 shows a working state of the series-parallel switched capacitor voltage converter in the phase 3 (T2-T3). The first switch transistor Q1A, the second switch transistor Q2A, the third switch transistor Q3A, the fourth switch transistor Q4A, the fifth switch transistor Q5A, the sixth switch transistor Q6A and the seventh switch transistor Q7A are turned off, the eighth switch transistor Q1B, the ninth switch transistor Q2B, the tenth switch transistor Q3B, the eleventh switch transistor Q4B, the twelfth switch transistor Q5B, the thirteenth switch transistor Q6B and the fourteenth switch transistor Q7B are turned off, the sixteenth switch transistor QX2A and the seventeenth switch transistor QX2B are turned off, the fifteenth switch transistor QX1A and the eighteenth switch transistor QX1B are turned on, and the first connection node C1NA and the second connection node C1NB are connected via the fifteenth switch transistor QX1A, the inductor L0 and the eighteenth switch transistor QX1B respectively. Since the fourth switch transistor Q4A is turned off after the phase 3 starts, the voltage of the node C2NA remains at zero, the voltage of node C2PA remains at the output voltage VOUT, the voltage of the first connection node C1NA continues to decrease, the voltage of the second connection node C1NB and the voltage of the node C2NB continue to increase, and the current of the inductor L0 starts to decrease. When the current of the inductor L0 decreases to zero, the voltage of the first connection node C1NA decreases to zero, the voltage of the second connection node C1NB increases to twice the output voltage: 2*VOUT, and the voltage of the node C2NB increases to the output voltage VOUT, and the controller controls the switch transistors to end the phase 3 state and start the phase 4.

Figure 7:
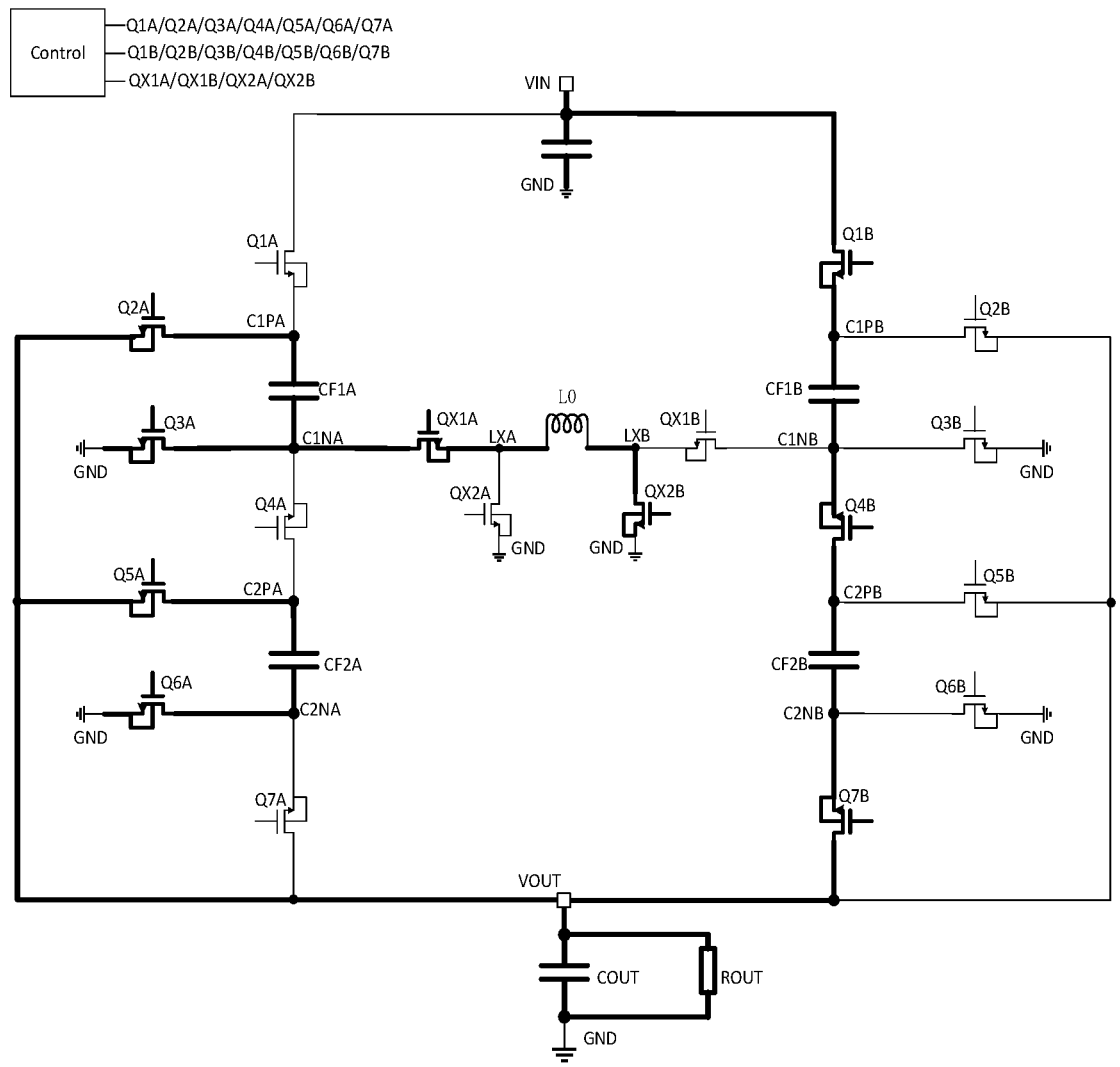
FIG. 7 is a diagram showing a working state of a fourth phase in the first working cycle as shown in the FIG. 3.

FIG. 7 shows a working state of the series-parallel switched capacitor voltage converter in the phase 4 (T3-T4). The first switch transistor Q1A, the fourth switch transistor Q4A and the seventh switch transistor Q7A are turned off, the second switch transistor Q2A, the third switch transistor Q3A, the fifth switch transistor Q5A and the sixth switch transistor Q6A are turned on, and the first capacitor CF1A and the second capacitor CF2A are connected in parallel between the output voltage VOUT and the ground GND. The eighth switch transistor Q1B, the eleventh switch transistor Q4B and the fourteenth switch transistor Q7B are turned on, the ninth switch transistor Q2B, the tenth switch transistor Q3B, the twelfth switch transistor Q5B and thirteenth switch transistor Q6B are turned off, and the input voltage VIN is connected to the output voltage VOUT via the third capacitor CF1B and the fourth capacitor CF2B in series; the seventeenth switch transistor QX2B and the fifteenth switch transistor QX1A are turned on, the eighteenth switch transistor QX1B and the sixteenth switch transistor QX2A are turned off, and the first connection node C1NA is connected to the GND via the fifteenth switch transistor QX1A, the inductor L0 and the seventeenth switch transistor QX2B respectively. When the phase 3 ends and the phase 4 starts, the voltage of the second connection node C1NB is twice the output voltage: 2*VOUT, the voltage of the node C1PB is the input voltage VIN, the voltage of the node C2NB is the output voltage VOUT, the voltage of the node C2PB is twice the output voltage: 2*VOUT. A voltage difference between both terminals of each of the eighth switch transistor Q1B, the eleventh switch transistor Q4B and the fourteenth switch transistor Q7B is zero before the eighth switch transistor Q1B, the eleventh switch transistor Q4B and the fourteenth switch transistor Q7B are turned on respectively, and the respective voltage differences of the eighth switch transistor Q1B, the eleventh switch transistor Q4B and the fourteenth switch transistor Q7B do not change before and after being switched on and off. The voltage of the first connection node C1NA is zero, the voltage of the node C1PA is the output voltage VOUT, the voltage of the node C2NA is zero, the voltage of the node C2PA is the output voltage VOUT, a voltage difference between both terminals of each of the second switch transistor Q2A, the fourth switch transistor Q4A, the fifth switch transistor Q5A and the sixth switch transistor Q6A is zero before the second switch transistor Q2A, the fourth switch transistor Q4A, the fifth switch transistor Q5A and the sixth switch transistor Q6A are turned on respectively, and the respective voltage differences of the second switch transistor Q2A, the fourth switch transistor Q4A, the fifth switch transistor Q5A and the sixth switch transistor Q6A do not change before and after being switched on and off. In the phase 4, the voltage of the second connection node C1NB is equal to twice the output voltage 2*VOUT, the voltage of the node C2NB is the output voltage VOUT, the voltage of the first node C1NA and the voltage of the node C2NA are equal to zero, the voltage of the node LXA and the voltage of the node LXB are equal to zero, and the current of the inductor L0 is zero.

Figure 8:
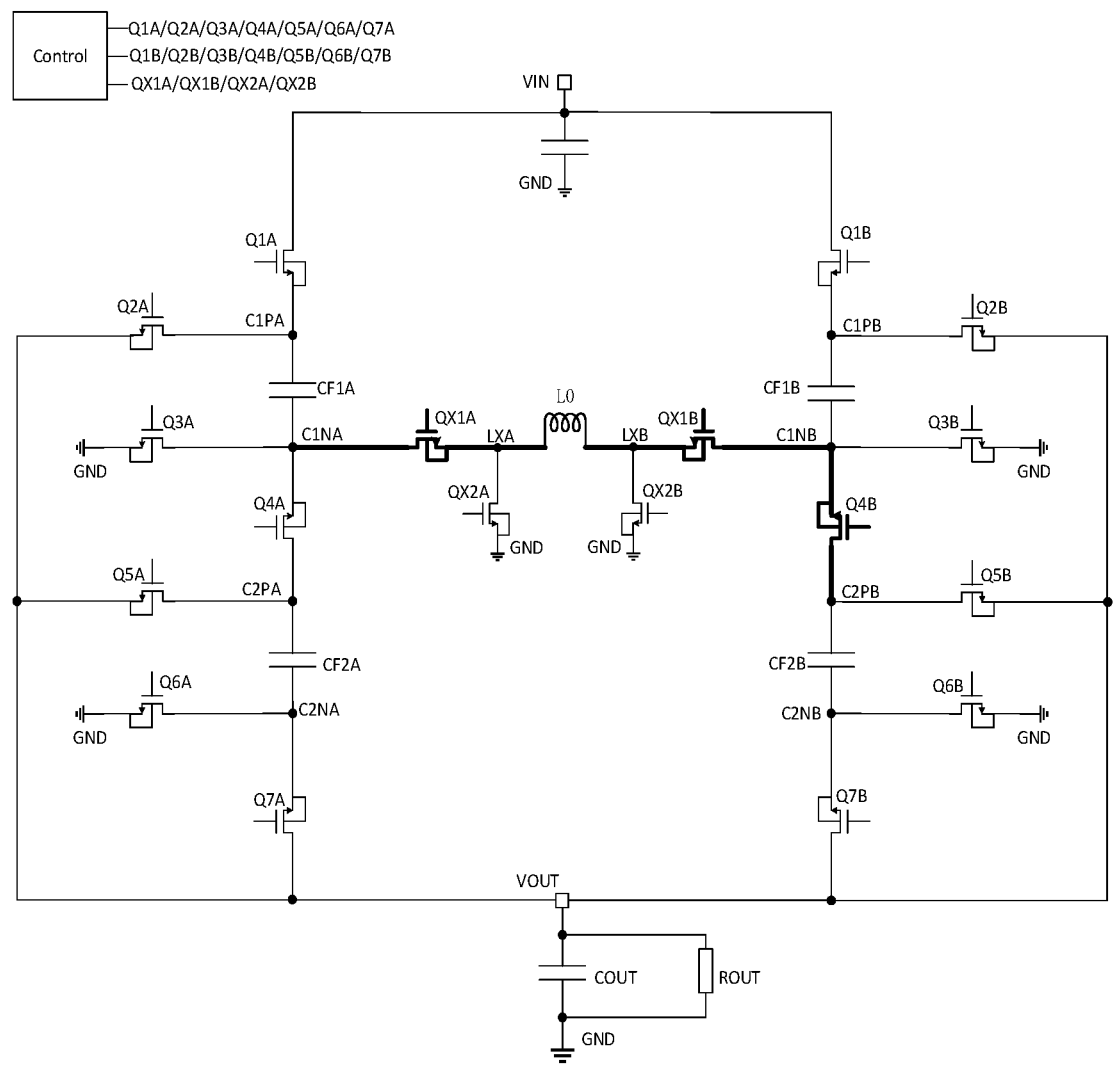
FIG. 8 is a diagram showing a working state of a fifth phase in the first working cycle as shown in the FIG. 3.

FIG. 8 shows a working state of the series-parallel switched capacitor voltage converter in the phase 5 (T4-T5). The first switch transistor Q1A, the second switch transistor Q2A, the third switch transistor Q3A, the fourth switch transistor Q4A, the fifth switch transistor Q5A, the sixth switch transistor Q6A and the seventh switch transistor Q7A are turned off, the eighth switch transistor Q1B, the ninth switch transistor Q2B, the tenth switch transistor Q3B, the twelfth switch transistor Q5B, the thirteenth switch transistor Q6B and the fourteenth switch transistor Q7B are turned off, the eleventh switch transistor Q4B is turned on, the sixteenth switch transistor QX2A and the seventeenth switch transistor QX2B are turned off, the fifteenth switch transistor QX1A and the eighteenth switch transistor QX1B are turned on, and the first connection node C1NA and the second connection node C1NB are connected via the fifteenth switch transistor QX1A, the inductor L0 and the eighteenth switch transistor QX1B respectively. At the beginning of the phase 5, the voltage of the second connection node C1NB is equal to twice the output voltage: 2*VOUT, the voltage of the node C2NB is equal to the output voltage VOUT, and the voltage of the first node C1NA and the voltage of the node C2NA are equal to zero. When the first connection node C1NA and the second connection node C1NB are connected via the inductor L0, the current of the inductor L0 flows from the node LXB to the node LXA and starts to increase, the voltage of the second connection node C1NB and the voltage of the node C2NB continuously decrease, and the voltage of the first node C1NA and the voltage of the node C2NA continuously increase. When the both voltages of the first connection node C1NA and the second connection node C1NB are equal to the output voltage VOUT, the current of the inductor L0 reaches the maximum value, the voltage of the node C2NB decreases to zero, and the controller controls the switch transistors to end the phase 5 state and start the phase 6.

Figure 9:
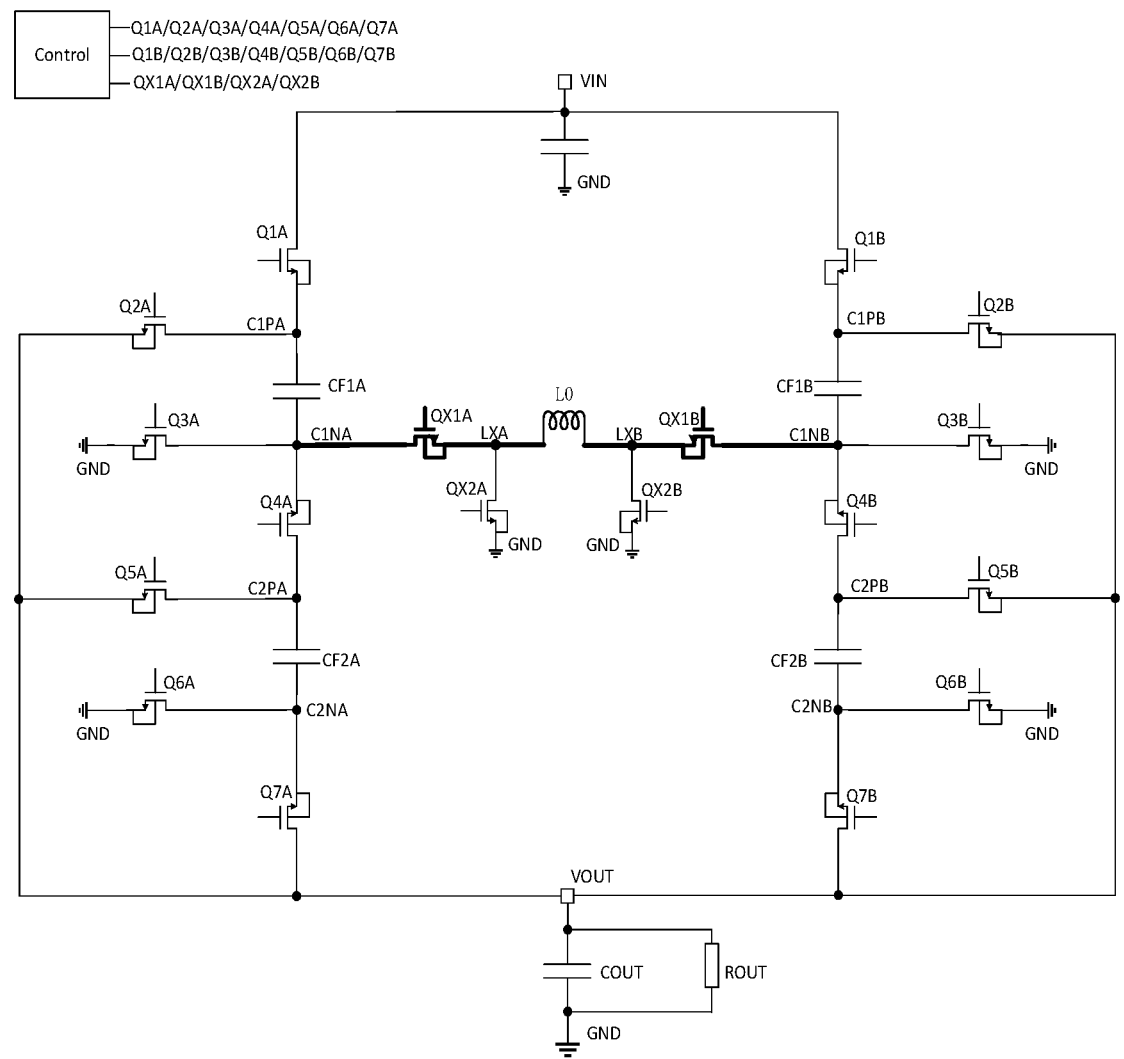
FIG. 9 is a diagram showing a working state of a sixth phase in the first working cycle as shown in the FIG. 3.

FIG. 9 shows a working state of the series-parallel switched capacitor voltage converter in phase 6 (T5-T6). The first switch transistor Q1A, the second switch transistor Q2A, the third switch transistor Q3A, the fourth switch transistor Q4A, the fifth switch transistor Q5A, the sixth switch transistor Q6A and the seventh switch transistor Q7A are turned off, the eighth switch transistor Q1B, the ninth switch transistor Q2B, the tenth switch transistor Q3B, the eleventh switch transistor Q4B, the twelfth switch transistor Q5B, the thirteenth switch transistor Q6B and the fourteenth switch transistor Q7B are turned off, the sixteenth switch transistor QX2A and the seventeenth switch transistor QX2B are turned off, the fifteenth switch transistor QX1A and the eighteenth switch transistor QX1B are turned on, and the first connection node C1NA and the second connection node C1NB are connected via the fifteenth switch transistor QX1A, the inductor L0 and the eighteenth switch transistor QX1B respectively. Since the eleventh switch transistor Q4B is turned off after the phase 6 starts, the voltage of the node C2NB remains at zero, the voltage of the node C2PB remains at the output voltage VOUT, the voltage of the second connection node C1NB continues to decrease, the both voltages of the first node C1NA and the node C2NA continue to increase, and the current of the inductor L0 starts to decrease. When the current of the inductor L0 decreases to zero, the voltage of the second connection node C1NB decreases to zero, the voltage of the first connection node C1NA increases to twice the output voltage 2*VOUT, and the voltage of the node C2NA increases to the output voltage VOUT, and the controller controls the switch transistors to end the phase 6 state and start the phase 1.

In the series-parallel switched capacitor voltage converter as described above, by controlling the fifteenth switch transistor QX1A, the sixteenth switch transistor QX2A, the eighteenth switch transistor QX1B and the seventeenth switch transistor QX2B, in the phase 2 and phase 3, the electric charges on the first connection node C1NA, the node C1PA, the node C2NA and the node C2PA of the first branch can be transferred to the second connection node C1NB, the node C1PB, the node C2NB and the node C2PB of the second branch through the inductor L0 respectively, so that, in the phase 4, the voltage difference between both terminals of each of the second switch transistor Q2A, the third switch transistor Q3A, the fifth switch transistor Q5A, the sixth switch transistor Q6A, eighth switch transistor Q1B, the eleventh switch transistor Q4B and the fourteenth switch transistor Q7B is zero before the second switch transistor Q2A, the third switch transistor Q3A, the fifth switch transistor Q5A, the sixth switch transistor Q6A, eighth switch transistor Q1B, the eleventh switch transistor Q4B and the fourteenth switch transistor Q7B are turned on respectively. In phase 5 and phase 6, the electric charges on the second connection node C1NB, the node C1PB, the node C2NB and the node C2PB of the second branch are completely transferred to the first connection node C1NA, the node C1PA, the node C2NA and the node C2PA of the first branch through the inductor L0 respectively, so that, in the phase 1, the voltage difference between both terminals of each of the first switch transistor Q1A, the fourth switch transistor Q4A, the seventh switch transistor Q7A, the ninth switch transistor Q2B, the tenth switch transistor Q3B, the twelfth switch transistor Q5B and thirteenth switch transistor Q6B is zero before the first switch transistor Q1A, the fourth switch transistor Q4A, the seventh switch transistor Q7A, the ninth switch transistor Q2B, the tenth switch transistor Q3B, the twelfth switch transistor Q5B and thirteenth switch transistor Q6B is turned on respectively. In this way, the voltage difference between both terminals of each of the first switch transistor Q1A, the second switch transistor Q2A, the third switch transistor Q3A, the fourth switch transistor Q4A, the fifth switch transistor Q5A, the sixth switch transistor Q6A, the seventh switch transistor Q7A, eighth switch transistor Q1B, the ninth switch transistor Q2B, the tenth switch transistor Q3B, the eleventh switch transistor Q4B, the twelfth switch transistor Q5B, the thirteenth switch transistor Q6B and the fourteenth switch transistor Q7B is zero before these switch transistors are turned on respectively, thereby greatly reducing the switching loss and improving the conversion efficiency of the series-parallel switched capacitor voltage converter.

Figure 10:
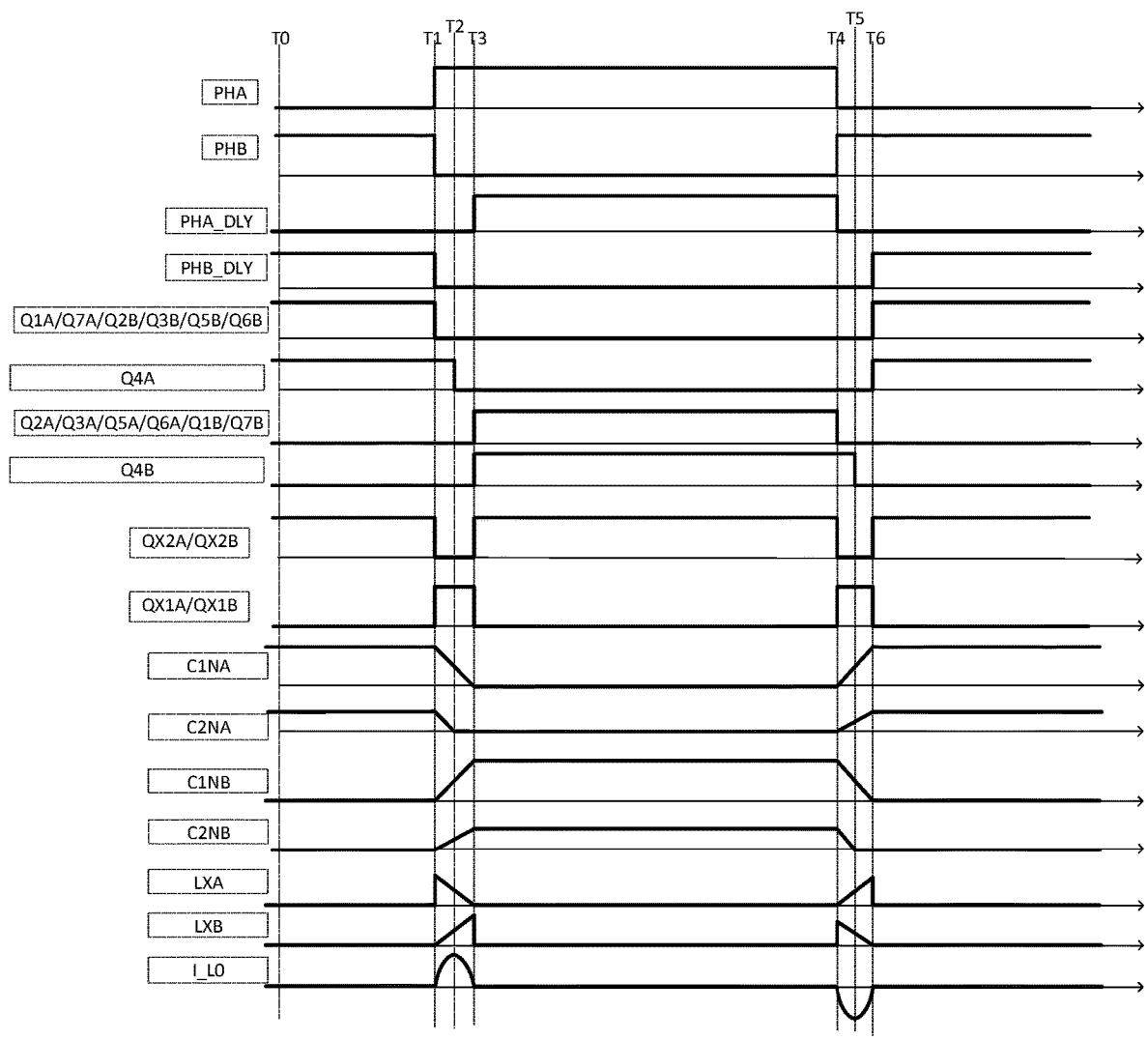
FIG. 10 is a second working cycle diagram of the circuit of the two-branch series-parallel 3:1 switched capacitor voltage converter of another embodiment of the present application.

The series-parallel switched capacitor voltage converter in FIG. 2 can also work according to a second working sequence as shown in FIG. 10, and there are six working states of phase 1 (T0-T1), phase 2 (T1-T2), phase 3 (T2-T3), phase 4 (T3-T/4), phase 5 (T4-T5) and phase 6 (T5-T/6) in sequence within one working cycle, and the main difference from FIG. 3 is the control sequence of the fifteenth switch transistor QX1A, the eighteenth switch transistor QX1B, the sixteenth switch transistor QX2A and the seventeenth switch transistor QX2B. This control method can also achieve the effect of decreasing the voltage difference between both terminals of each of the first switch transistor Q1A, the second switch transistor Q2A, the third switch transistor Q3A, the fourth switch transistor Q4A, the fifth switch transistor Q5A, the sixth switch transistor Q6A, the seventh switch transistor Q7A, eighth switch transistor Q1B, the ninth switch transistor Q2B, the tenth switch transistor Q3B, the eleventh switch transistor Q4B, the twelfth switch transistor Q5B, the thirteenth switch transistor Q6B and the fourteenth switch transistor Q7B to zero before these switch transistors are turned on respectively.

Figure 11:
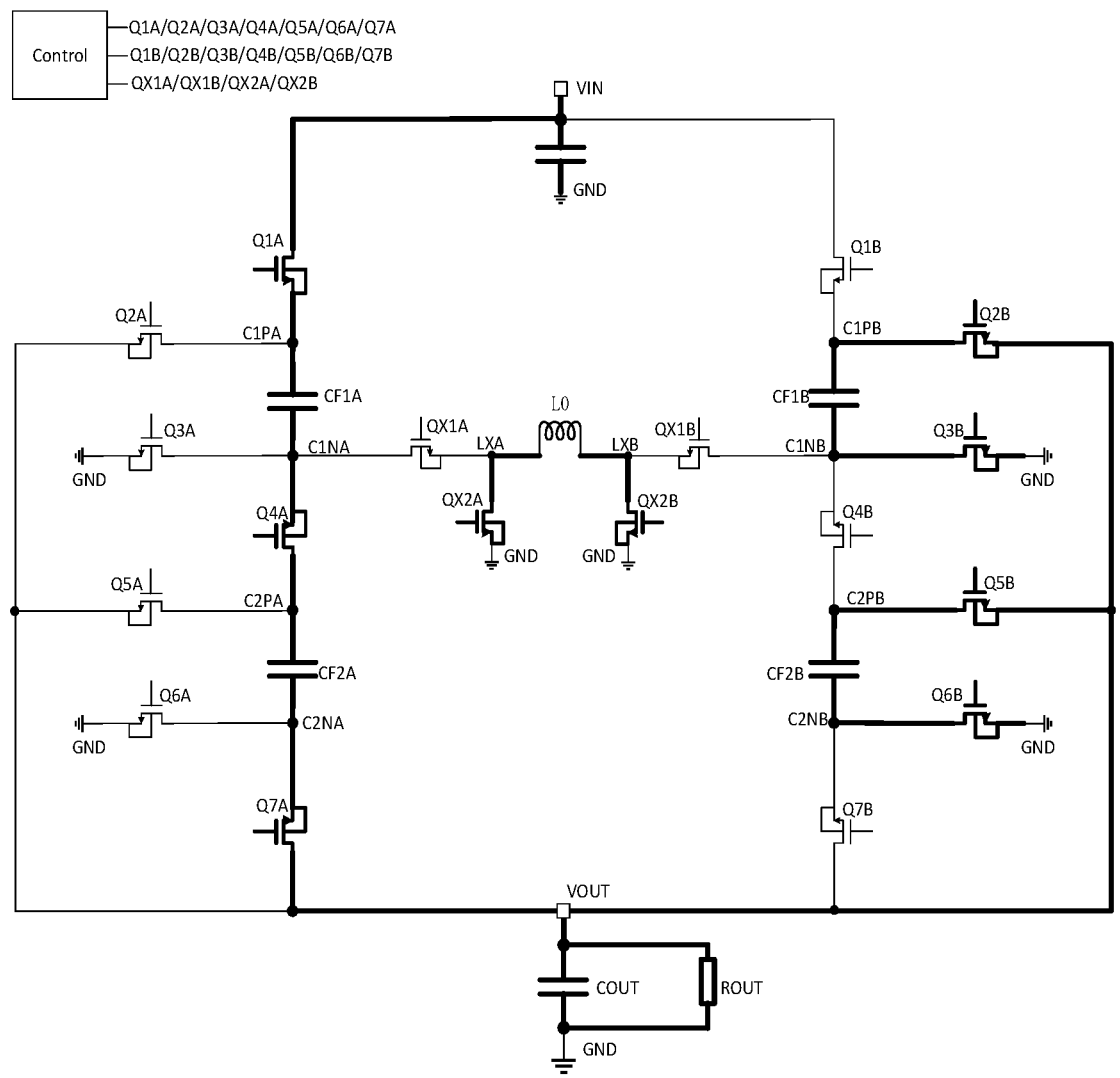
FIG. 11 is a diagram showing a working state of a first phase in the second working cycle as shown in the FIG. 10.

FIG. 11 shows a working state of the series-parallel switched capacitor voltage converter in the phase 1 (T0-T1). The first switch transistor Q1A, the fourth switch transistor Q4A and the seventh switch transistor Q7A are turned on, the second switch transistor Q2A, the third switch transistor Q3A, the fifth switch transistor Q5A and the sixth switch transistor Q6A are turned off, and the input voltage VIN is connected to the output voltage VOUT via the first capacitor CF1A and the second capacitor CF2A in series. The eighth switch transistor Q1B, the eleventh switch transistor Q4B and the fourteenth switch transistor Q7B are turned off, the ninth switch transistor Q2B, the tenth switch transistor Q3B, the twelfth switch transistor Q5B and thirteenth switch transistor Q6B are turned on, and the third capacitor CF1B and the fourth capacitor CF2B are connected in parallel between the output voltage VOUT and the ground GND. The sixteenth switch transistor QX2A and the seventeenth switch transistor QX2B are turned on, the fifteenth switch transistor QX1A and the eighteenth switch transistor QX1B are turned off, and both terminals of the inductor L0 is connected to GND via the switch sixteenth switch transistor QX2A and the switch seventeenth switch transistor QX2B respectively. When the phase 6 ends and the phase 1 starts, the voltage of the first connection node C1NA is twice the output voltage: 2*VOUT, the voltage of the node C1PA is the input voltage VIN, the voltage of the node C2NA is the output voltage VOUT, the voltage of the node C2PA is twice the output voltage: 2*VOUT, and a voltage difference between both terminals of each of the first switch transistor Q1A, the fourth switch transistor Q4A and the seventh switch transistor Q7A is zero before the first switch transistor Q1A, the fourth switch transistor Q4A and the seventh switch transistor Q7A are turned on respectively, and the respective voltage differences of the first switch transistor Q1A, the fourth switch transistor Q4A and the seventh switch transistor Q7A do not change before and after being switched on and off; the voltage of the second connection node C1NB is zero, the voltage of the node C1PB is the output voltage VOUT, the voltage of the node C2NB is zero, the voltage of the node C2PB is the output voltage VOUT, a voltage difference between both terminals of each of the ninth switch transistor Q2B, the tenth switch transistor Q3B, the twelfth switch transistor Q5B and thirteenth switch transistor Q6B is zero before the ninth switch transistor Q2B, the tenth switch transistor Q3B, the twelfth switch transistor Q5B and thirteenth switch transistor Q6B are turned on respectively, and the respective voltage differences of the ninth switch transistor Q2B, the tenth switch transistor Q3B, the twelfth switch transistor Q5B and thirteenth switch transistor Q6B do not change before and after being switched on and off. In the phase 1, the voltage of the first connection node C1NA is equal to twice the output voltage: 2*VOUT, the voltage of the node C2NA is the output voltage VOUT, the voltage of the second connection node C1NB and the voltage of the node C2NB are equal to zero, the voltage of the node LXA and the voltage of the node LXB are equal to zero, and the current of the inductor L0 is zero.

Figure 12:
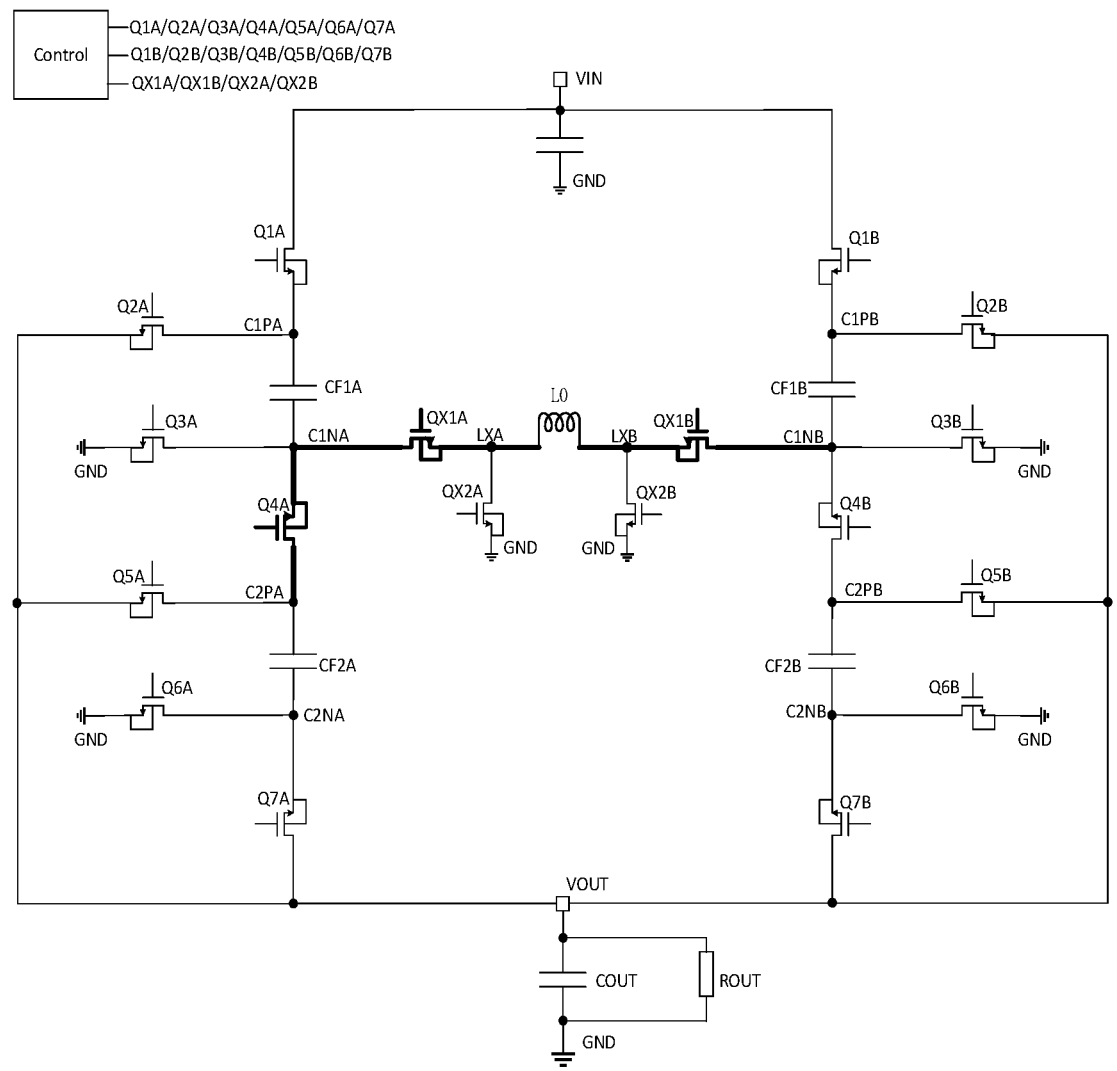
FIG. 12 is a diagram showing a working state of a second phase in the second working cycle as shown in the FIG. 10.

FIG. 12 shows a working state of the series-parallel switched capacitor voltage converter in the phase 2 (T1-T2). The first switch transistor Q1A, the second switch transistor Q2A, the third switch transistor Q3A, the fifth switch transistor Q5A, the sixth switch transistor Q6A and the seventh switch transistor Q7A are turned off, the fourth switch transistor Q4A is turned on, the eighth switch transistor Q1B, the ninth switch transistor Q2B, the tenth switch transistor Q3B, the eleventh switch transistor Q4B, the twelfth switch transistor Q5B, the thirteenth switch transistor Q6B and the fourteenth switch transistor Q7B are turned off, the sixteenth switch transistor QX2A and the seventeenth switch transistor QX2B are turned off, the fifteenth switch transistor QX1A and the eighteenth switch transistor QX1B are turned on, and the first connection node C1NA and the second connection node C1NB are connected via the fifteenth switch transistor QX1A, the inductor L0 and the eighteenth switch transistor QX1B respectively. At the beginning of the phase 2, the voltage of the first connection node C1NA is equal to twice the output voltage: 2*VOUT, the voltage of the node C2NA is equal to the output voltage VOUT, and the voltage of the second connection node C1NB and the voltage of the node C2NB are equal to zero. When the first connection node C1NA and the second connection node C1NB are connected via the inductor L0, the current of the inductor L0 flows from the node LXA to the node LXB and starts to increase, the voltage of the first node C1NA and the voltage of the node C2NA continuously decrease, and the voltage of the second connection node C1NB and the voltage of the node C2NB continuously increase. When the voltage of the first connection node C1NA and the voltage of the second connection node C1NB are equal to the output voltage VOUT, the current of the inductor L0 reaches the maximum value, the voltage of the node C2NA decreases to zero, and the controller controls the switch transistors to end the phase 2 state and start the phase 3.

Figure 13:
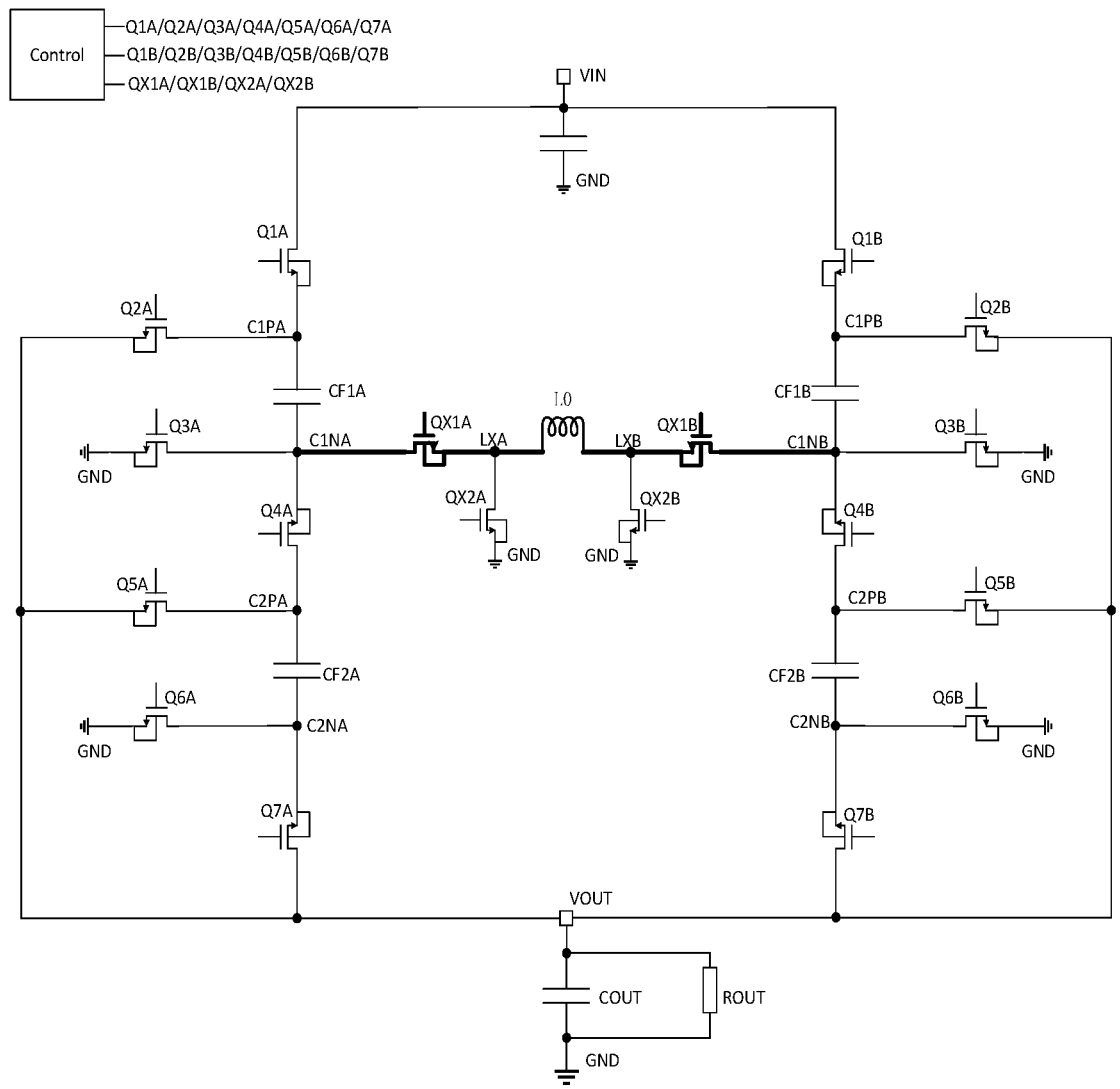
FIG. 13 is a diagram showing a working state of a third phase in the second working cycle as shown in the FIG. 10.

FIG. 13 shows a working state of the series-parallel switched capacitor voltage converter in the phase 3 (T2-T3). The first switch transistor Q1A, the second switch transistor Q2A, the third switch transistor Q3A, the fourth switch transistor Q4A, the fifth switch transistor Q5A, the sixth switch transistor Q6A and the seventh switch transistor Q7A are turned off, the eighth switch transistor Q1B, the ninth switch transistor Q2B, the tenth switch transistor Q3B, the eleventh switch transistor Q4B, the twelfth switch transistor Q5B, the thirteenth switch transistor Q6B and the fourteenth switch transistor Q7B are turned off, the sixteenth switch transistor QX2A and the seventeenth switch transistor QX2B are turned off, the fifteenth switch transistor QX1A and the eighteenth switch transistor QX1B are turned on, and the first connection node C1NA and the second connection node C1NB are connected via the fifteenth switch transistor QX1A, the inductor L0 and the eighteenth switch transistor QX1B respectively. Since the fourth switch transistor Q4A is turned off after phase 3 starts, the voltage of the node C2NA remains at zero, the voltage of the node C2PA remains at the output voltage VOUT, the voltage of the first connection node C1NA continues to decrease, the voltage of the second connection node C1NB and the voltage of the node C2NB continue to increase, and the current of the inductor L0 starts to decrease. When the current of the inductor L0 decreases to zero, the voltage of the first connection node C1NA decreases to zero, the voltage of the second connection node C1NB increases to twice the output voltage: 2*VOUT, and the voltage of the node C2NB increases to the output voltage VOUT, and the controller controls the switch transistors to end the phase 3 and start the phase 4.

Figure 14:
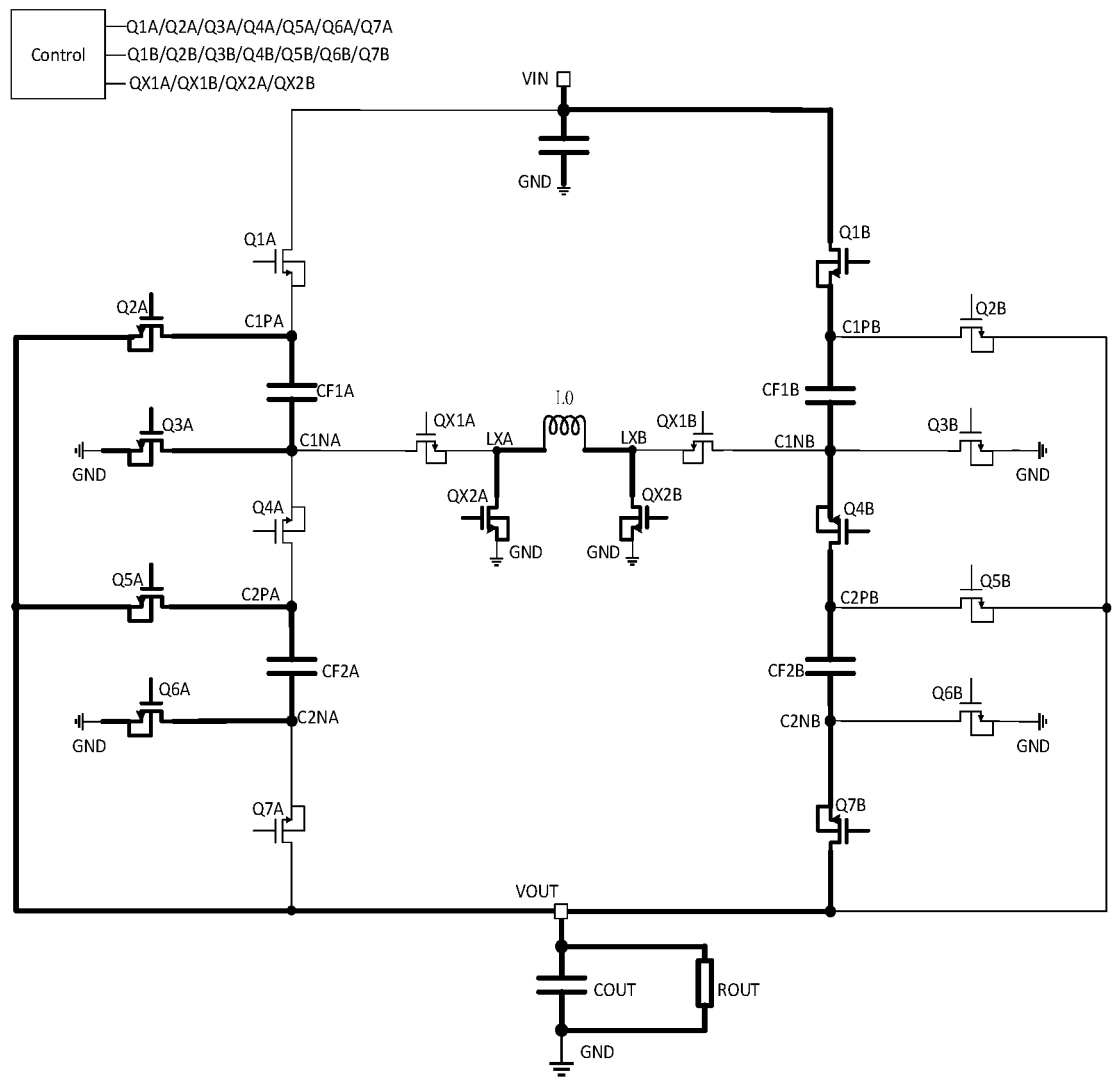
FIG. 14 is a diagram showing a working state of a fourth phase in the second working cycle as shown in the FIG. 10.

FIG. 14 shows a working state of the series-parallel switched capacitor voltage converter in the phase 4 (T3-T4). The first switch transistor Q1A, the fourth switch transistor Q4A and the seventh switch transistor Q7A are turned off, the second switch transistor Q2A, the third switch transistor Q3A, the fifth switch transistor Q5A and the sixth switch transistor Q6A are turned on, and the first capacitor CF1A and the second capacitor CF2A are connected in parallel between the output voltage VOUT and the ground GND. The eighth switch transistor Q1B, the eleventh switch transistor Q4B and the fourteenth switch transistor Q7B are turned on, the ninth switch transistor Q2B, the tenth switch transistor Q3B, the twelfth switch transistor Q5B and thirteenth switch transistor Q6B are turned off, and the input voltage VIN is connected to the output voltage VOUT via the third capacitor CF1B and the fourth capacitor CF2B in series. The sixteenth switch transistor QX2A and the seventeenth switch transistor QX2B are turned on, the fifteenth switch transistor QX1A and the eighteenth switch transistor QX1B are turned off, and the both terminals of the inductor L0 are connected to GND via the switch sixteenth switch transistor QX2A and the switch seventeenth switch transistor QX2B respectively. When the phase 3 ends and the phase 4 starts, the voltage of the second connection node C1NB is twice the output voltage: 2*VOUT, the voltage of the node C1PB is the input voltage VIN, the voltage of the node C2NB is the output voltage VOUT, the voltage of the node C2PB is twice the output voltage: 2*VOUT, and a voltage difference between both terminals of each of the eighth switch transistor Q1B, the eleventh switch transistor Q4B and the fourteenth switch transistor Q7B is zero before the eighth switch transistor Q1B, the eleventh switch transistor Q4B and the fourteenth switch transistor Q7B are turned on respectively, and the respective voltage differences of the eighth switch transistor Q1B, the eleventh switch transistor Q4B and the fourteenth switch transistor Q7B do not change before and after being switched on and off; the voltage of the first connection node C1NA is zero, the voltage of the node C1PA is the output voltage VOUT, the voltage of the node C2NA is zero, the voltage of the node C2PA is the output voltage VOUT, a voltage difference between both terminals of the second switch transistor Q2A, the fourth switch transistor Q4A, the fifth switch transistor Q5A and the sixth switch transistor Q6A is zero before the second switch transistor Q2A, the fourth switch transistor Q4A, the fifth switch transistor Q5A and the sixth switch transistor Q6A are turned on respectively, and the respective voltage differences of the second switch transistor Q2A, the fourth switch transistor Q4A, the fifth switch transistor Q5A and the sixth switch transistor Q6A do not change before and after being switched on and off. In the phase 4, the voltage of the second connection node C1NB is equal to twice the output voltage: 2*VOUT, the voltage of the node C2NB is the output voltage VOUT, the voltage of the first node C1NA and the voltage of the node C2NA are equal to zero, the voltage of the node LXA and the voltage of the node LXB are equal to zero, and the current of the inductor L0 is zero.

Figure 15:
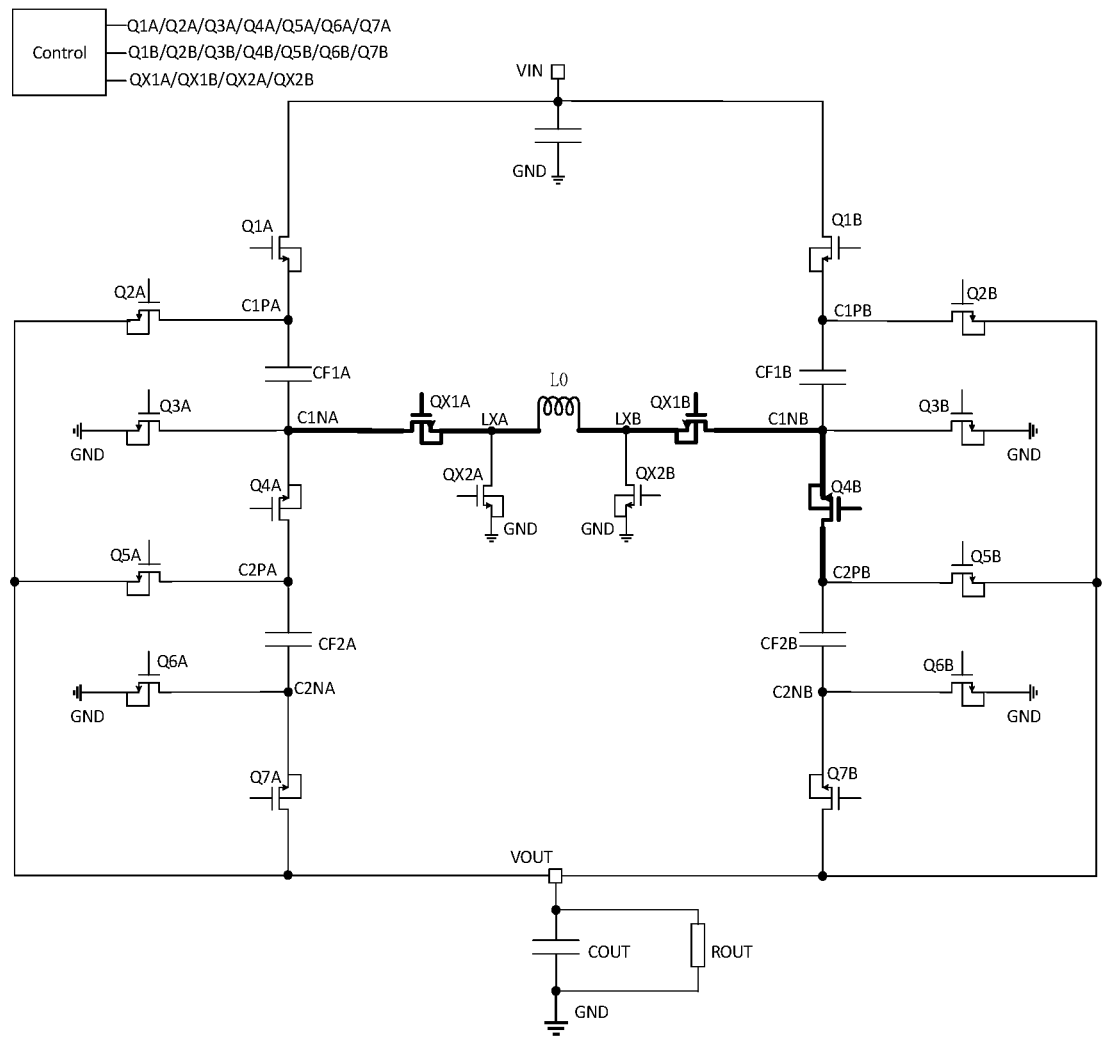
FIG. 15 is a diagram showing a working state of a fifth phase in the second working cycle as shown in the FIG. 10.

FIG. 15 shows a working state of the series-parallel switched capacitor voltage converter in the phase 5 (T4-T5). The first switch transistor Q1A, the second switch transistor Q2A, the third switch transistor Q3A, the fourth switch transistor Q4A, the fifth switch transistor Q5A, the sixth switch transistor Q6A and the seventh switch transistor Q7A are turned off, the eighth switch transistor Q1B, the ninth switch transistor Q2B, the tenth switch transistor Q3B, the twelfth switch transistor Q5B, the thirteenth switch transistor Q6B and the fourteenth switch transistor Q7B are turned off, the eleventh switch transistor Q4B is turned on, the sixteenth switch transistor QX2A and the seventeenth switch transistor QX2B are turned off, the fifteenth switch transistor QX1A and the eighteenth switch transistor QX1B are turned on, and the first connection node C1NA and the second connection node C1NB are connected via the fifteenth switch transistor QX1A, the inductor L0 and the eighteenth switch transistor QX1B respectively. At the beginning of the phase 5, the voltage of the second connection node C1NB is equal to twice the output voltage: 2*VOUT, the voltage of the node C2NB is equal to the output voltage VOUT, and the voltage of the first node C1NA and the voltage of the node C2NA are equal to zero. When the first connection node C1NA and the second connection node C1NB are connected via the inductor L0, the current of the inductor L0 flows from the node LXB to the node LXA and starts to increase, the voltage of the second connection node C1NB and the voltage of the node C2NB continuously decrease, and the voltage of the first node C1NA and the voltage of the node C2NA continuously increase. When the both voltages of the first connection node C1NA and the second connection node C1NB are equal to the output voltage VOUT, the current of the inductor L0 reaches the maximum value, the voltage of the node C2NB decreases to zero, and the controller controls the switch transistors to end the phase 5 state and start the phase 6.

Figure 16:
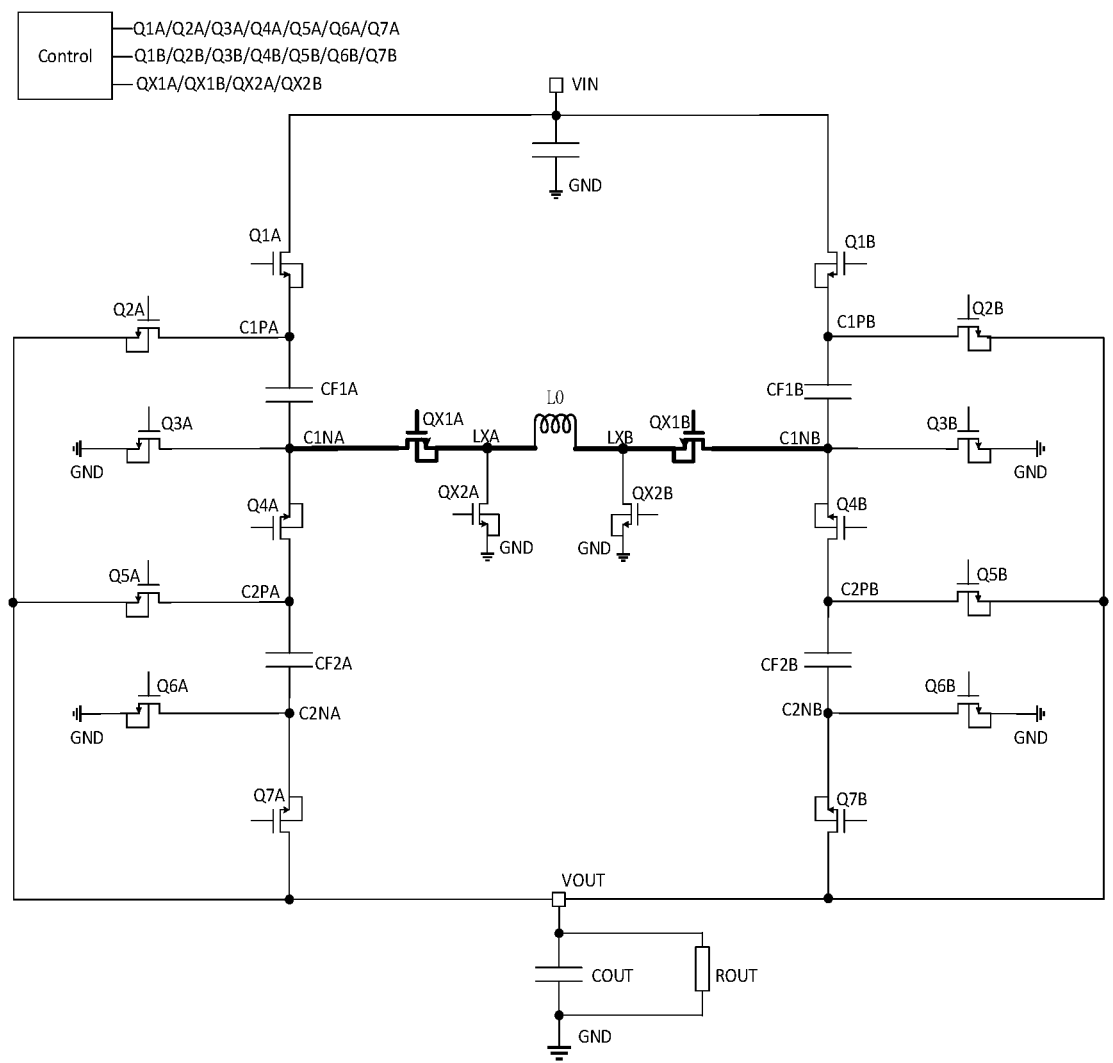
FIG. 16 is a diagram showing a working state of a sixth phase in the second working cycle as shown in the FIG. 10.

FIG. 16 shows a working state of the series-parallel switched capacitor voltage converter in the phase 6 (T5-T6). The first switch transistor Q1A, the second switch transistor Q2A, the third switch transistor Q3A, the fourth switch transistor Q4A, the fifth switch transistor Q5A, the sixth switch transistor Q6A and the seventh switch transistor Q7A are turned off, the eighth switch transistor Q1B, the ninth switch transistor Q2B, the tenth switch transistor Q3B, the eleventh switch transistor Q4B, the twelfth switch transistor Q5B, the thirteenth switch transistor Q6B and the fourteenth switch transistor Q7B are turned off, the sixteenth switch transistor QX2A and the seventeenth switch transistor QX2B are turned off, the fifteenth switch transistor QX1A and the eighteenth switch transistor QX1B are turned on, and the first connection node C1NA and the second connection node C1NB are connected via the fifteenth switch transistor QX1A, the inductor L0 and the eighteenth switch transistor QX1B respectively. Since the eleventh switch transistor Q4B is turned off after the phase 6 starts, the voltage of the node C2NB remains at zero, the voltage of the node C2PB remains at the output voltage VOUT, the voltage of the second connection node C1NB continues to decrease, the voltage of the first node C1NA and the voltage of the node C2NA continue to increase, and the current of the inductor L0 starts to decrease. When the current of the inductor L0 current decreases to zero, the voltage of the second connection node C1NB decreases to zero, the voltage of the first connection node C1NA increases to twice the output voltage: 2*VOUT, and the voltage of the node C2NA increases to the output voltage VOUT, and the controller controls the switch transistors to end the phase 6 state and start the phase 1.

In the series-parallel switched capacitor voltage converter as described above, by controlling the switches fifteenth switch transistor QX1A, the sixteenth switch transistor QX2A, the eighteenth switch transistor QX1B and the seventeenth switch transistor QX2B, in the phase 2 and phase 3, the electric charges on the first connection node C1NA, the node C1PA, the node C2NA and the node C2PA of the first branch can be completely transferred to the second connection node C1NB, the node C1PB, the node C2NB and the node C2PB of the second branch via the inductor L0 respectively, so that, in the phase 4, the voltage difference between both terminals of each of the second switch transistor Q2A, the third switch transistor Q3A, the fifth switch transistor Q5A, the sixth switch transistor Q6A, eighth switch transistor Q1B, the eleventh switch transistor Q4B and the fourteenth switch transistor Q7B is zero before the second switch transistor Q2A, the third switch transistor Q3A, the fifth switch transistor Q5A, the sixth switch transistor Q6A, eighth switch transistor Q1B, the eleventh switch transistor Q4B and the fourteenth switch transistor Q7B are turned on respectively. In the phase 5 and phase 6, the electric charges on the second connection node C1NB, the node C1PB, the node C2NB and the node C2PB of the second branch can be completely transferred to the first connection node C1NA, the node C1PA, the node C2NA and the node C2PA of the first branch via the inductor L0, so that, the phase 1, the voltage difference between both terminals of each of the first switch transistor Q1A, the fourth switch transistor Q4A, the seventh switch transistor Q7A, the ninth switch transistor Q2B, the tenth switch transistor Q3B, the twelfth switch transistor Q5B and thirteenth switch transistor Q6B is zero before the first switch transistor Q1A, the fourth switch transistor Q4A, the seventh switch transistor Q7A, the ninth switch transistor Q2B, the tenth switch transistor Q3B, the twelfth switch transistor Q5B and thirteenth switch transistor Q6B are turned on respectively. In this way, a voltage difference between both terminals of each of the first switch transistor Q1A, the second switch transistor Q2A, the third switch transistor Q3A, the fourth switch transistor Q4A, the fifth switch transistor Q5A, the sixth switch transistor Q6A, the seventh switch transistor Q7A, the eighth switch transistor Q1B, the ninth switch transistor Q2B, the tenth switch transistor Q3B, the eleventh switch transistor Q4B, the twelfth switch transistor Q5B, the thirteenth switch transistor Q6B and the fourteenth switch transistor Q7B is zero before these switch transistors are turned on respectively, thereby greatly reducing the switching loss and improving the conversion efficiency of the series-parallel switched capacitor voltage converter.

Figure 17:
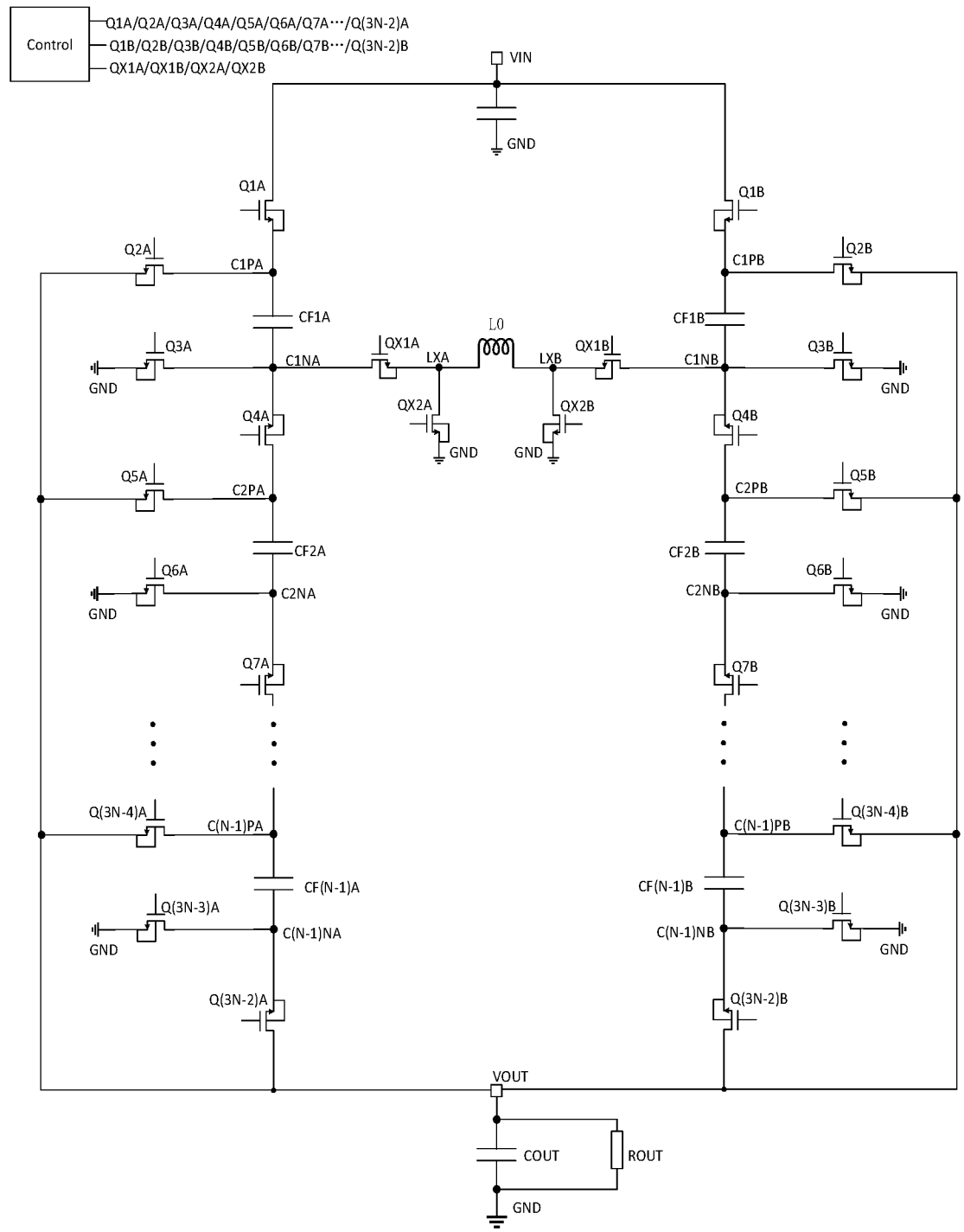
FIG. 17 is a schematic diagram of another circuit structure of another two-branch series-parallel N:1 switched capacitor voltage converter according to an embodiment of the present application.

The series-parallel switched capacitor voltage converter and control method are applicable not only to the two-branch series-parallel 3:1 switched capacitor voltage converter of the above examples, but also to other series-parallel switched capacitor voltage converters, such as two-branch series-parallel N:1 switched capacitor voltage converter as shown in FIG. 17.

FIG. 17 shows a circuit of a two-branch series-parallel N:1 switched capacitor voltage converter, and the two-branch series-parallel N:1 switched capacitor voltage converter includes an inductive branch and two branches, and the two branches include a first branch and a second branch.

The first branch includes the first switch transistor Q1A and N−1 first basic units, N is an integer greater than or equal to 4, the first terminal of the first switch transistor Q1A is the input terminal of the two-branch series-parallel N:1 switched capacitor voltage converter, the input terminal of the two-branch series-parallel N:1 switched capacitor voltage converter is connected to the external input voltage VIN, the second terminal of the first switch transistor Q1A is connected to the output terminal VOUT of the two-branch series-parallel N:1 switched capacitor voltage converter through the N−1 first basic units in turn. Each of the N−1 first basic units includes an input terminal, a first output terminal and a second output terminal, the second terminal of the first switch transistor Q1A is connected to an input terminal of the 1th first basic unit, the first output terminal of each first basic unit is connected the input terminal of the next first basic unit, and the first output terminal of the last first basic unit and the respective second output terminals of all the N−1 first basic units are connected to the output terminal of the two-branch series-parallel N:1 switched capacitor voltage converter.

Each first basic unit includes a first sub-capacitor, a first sub-switch transistor, a second sub-switch transistor and a third sub-switch transistor, a first terminal of the first sub-capacitor is connected to a first terminal of the first sub-switch transistor, the first terminal of the first sub-capacitor is the input terminal of the first basic unit, and a second terminal of the first sub-switch transistor is a second output terminal of the first basic unit. A second terminal of the first sub-capacitor is connected to a first terminal of the second sub-switch transistor and a first terminal of the third sub-switch transistor, a second terminal of the second sub-switch transistor is connected to the ground, and a second terminal of the third sub-switch transistor is the first output terminal of the first basic unit.

For example, as shown in FIG. 17, the 1th first basic unit includes the second switch transistor Q2A, the third switch transistor Q3A, the fourth switch transistor Q4A and the first capacitor CF1A, the 2th first basic unit includes the fifth switch transistor Q5A, the sixth switch transistor Q6A, the seventh switch transistor Q7A and the second capacitor CF2A, . . . , the (N−1)th basic unit includes a first sub-capacitor CF(N−1)A, a first sub-switch transistor Q(3N−4)A, a second sub-switch transistor Q(3N−3)A and a third sub-switch transistor Q(3N−2)A.

The second terminal of the first switch transistor Q1A is connected to the input terminal of the 1th A first basic unit, a first terminal of the first capacitor CF1A is connected to a first terminal of the second switch transistor Q2A, the first terminal of the first capacitor CF1A is the input terminal of the 1th first basic unit, and a second terminal of the second switch transistor Q2A is the output terminal of the 1th first basic unit. A second terminal of the first capacitor CF1A is connected to a first terminal of the third switch transistor Q3A and a first terminal of the fourth switch transistor Q4A, a second terminal of the third switch transistor Q3A is connected to the ground, and a second terminal of the fourth switch transistor Q4A is the first output terminal of the 1th first basic unit.

The first output terminal of the 1th first basic unit is connected to the input terminal of the 2th A first basic unit, a first terminal of the second capacitor CF2A is connected to a first terminal of the fifth switch transistor Q5A, the first terminal of the second capacitor CF2A is the input terminal of the 2th first basic unit, and a second terminal of the fifth switch transistor Q5A is the output terminal of the 2th first basic unit. A second terminal of the second capacitor CF2A is connected to a first terminal of the sixth switch transistor Q6A and a first terminal of the seventh switch transistor Q7A, a second terminal of the sixth switch transistor Q6A is connected to the ground, and a second terminal of the seventh switch transistor Q7A is the first output terminal of the 2th first basic unit.

A first terminal of the first sub-capacitor CF(N−1)A is connected to a first terminal of the first sub-switch transistor Q(3N−4)A, the first terminal of the first sub-capacitor CF(N−1)A is the input terminal of the (N−1)th first basic unit, and a second terminal of the first sub-switch transistor Q(3N−4)A is the output terminal of the (N−1)th first basic unit. A second terminal of the first sub-capacitor CF(N−1)A is connected to a first terminal of the second sub-switch transistor Q(3N−3)A and a first terminal of the third sub-switch transistor Q(3N−2)A, a second terminal of the second sub-switch transistor Q(3N−3)A is connected to the ground, and a second terminal of the third sub-switch transistor Q(3N−2)A is the first output terminal of the (N−1)th first basic unit, and the first output terminal of the (N−1)th first basic unit is connected to the ground.

The second branch includes the eighth switch transistor Q1B and N−1 second basic units, N is an integer greater than or equal to 4, the first terminal of the eighth switch transistor Q1B is the input terminal of the two-branch series-parallel N:1 switched capacitor voltage converter, the input terminal of the two-branch series-parallel N:1 switched capacitor voltage converter is connected to the external input voltage VIN, the second terminal of the eighth switch transistor Q1B is connected to the output terminal VOUT of the two-branch series-parallel N:1 switched capacitor voltage converter through the N−1 second basic units in turn. Each of the N−1 second basic units includes an input terminal, a first output terminal and a second output terminal, the second terminal of the eighth switch transistor Q1B is connected to an input terminal of the 1th second basic unit, the first output terminal of each second basic unit is connected the input terminal of the next second basic unit, and the first output terminal of the last second basic unit and the respective second output terminals of all the N−1 second basic units are connected to the output terminal of the two-branch series-parallel N:1 switched capacitor voltage converter.

Each second basic unit includes a second sub-capacitor, a fourth sub-switch transistor, a fifth sub-switch transistor and a sixth sub-switch transistor, a first terminal of the second sub-capacitor is connected to a first terminal of the fourth sub-switch transistor, the first terminal of the second sub-capacitor is the input terminal of the second basic unit, and a second terminal of the fourth sub-switch transistor is a second output terminal of the second basic unit. A second terminal of the second sub-capacitor is connected to a first terminal of the fifth sub-switch transistor and a first terminal of the sixth sub-switch transistor, a second terminal of the fifth sub-switch transistor is connected to the ground, and a second terminal of the sixth sub-switch transistor is the first output terminal of the second basic unit.

For example, as shown in FIG. 17, the 1th second basic unit includes the ninth switch transistor Q2B, the tenth switch transistor Q3B, the eleventh switch transistor Q4B and the third capacitor CF1B, the 2th second basic unit includes the twelfth switch transistor Q5B, the thirteenth switch transistor Q6B, the fourteenth switch transistor Q7B and the fourth capacitor CF2B, . . . , the (N−1)th basic unit includes a second sub-capacitor CF(N−1)B, a fourth sub-switch transistor Q(3N−4)B, a fifth sub-switch transistor Q(3N−3)B and a sixth sub-switch transistor Q(3N−2)B.

The second terminal of the eighth switch transistor Q1B is connected to the input terminal of the 1th A second basic unit, a first terminal of the third capacitor CF1B is connected to a first terminal of the ninth switch transistor Q2B, the first terminal of the third capacitor CF1B is the input terminal of the 1th second basic unit, and a second terminal of the ninth switch transistor Q2B is the output terminal of the 1th second basic unit. A second terminal of the third capacitor CF1B is connected to a first terminal of the tenth switch transistor Q3B and a first terminal of the eleventh switch transistor Q4B, a second terminal of the tenth switch transistor Q3B is connected to the ground, and a second terminal of the eleventh switch transistor Q4B is the first output terminal of the 1th second basic unit.

The first output terminal of the 1th second basic unit is connected to the input terminal of the 2th A second basic unit, a first terminal of the fourth capacitor CF2B is connected to a first terminal of the twelfth switch transistor Q5B, the first terminal of the fourth capacitor CF2B is the input terminal of the 2th second basic unit, and a second terminal of the twelfth switch transistor Q5B is the output terminal of the 2th second basic unit. A second terminal of the fourth capacitor CF2B is connected to a first terminal of the thirteenth switch transistor Q6B and a first terminal of the fourteenth switch transistor Q7B, a second terminal of the thirteenth switch transistor Q6B is connected to the ground, and a second terminal of the fourteenth switch transistor Q7B is the first output terminal of the 2th second basic unit.

A first terminal of the second sub-capacitor CF(N−1)B is connected to a first terminal of the fourth sub-switch transistor Q(3N−4)B, the first terminal of the second sub-capacitor CF(N−1)B is the input terminal of the (N−1)th second basic unit, and a second terminal of the fourth sub-switch transistor Q(3N−4)B is the output terminal of the (N−1)th second basic unit. A second terminal of the second sub-capacitor CF(N−1)B is connected to a first terminal of the fifth sub-switch transistor Q(3N−3)B and a first terminal of the sixth sub-switch transistor Q(3N−2)B, a second terminal of the fifth sub-switch transistor Q(3N−3)B is connected to the ground, and a second terminal of the sixth sub-switch transistor Q(3N−2)B is the first output terminal of the (N−1)th second basic unit, and the first output terminal of the (N−1)th second basic unit is connected the ground.

The type and number of switches introduced are not limited to the four N-transistors in the above examples, but may be other numbers of other types of transistors or diodes. The introduced inductor and switches are also not limited to be connected between C1NA and C1NB, but may also be connected between other nodes of the two branches, such as between C1PA and C1PB as shown in FIGS. 18 and 19.

Figure 18:
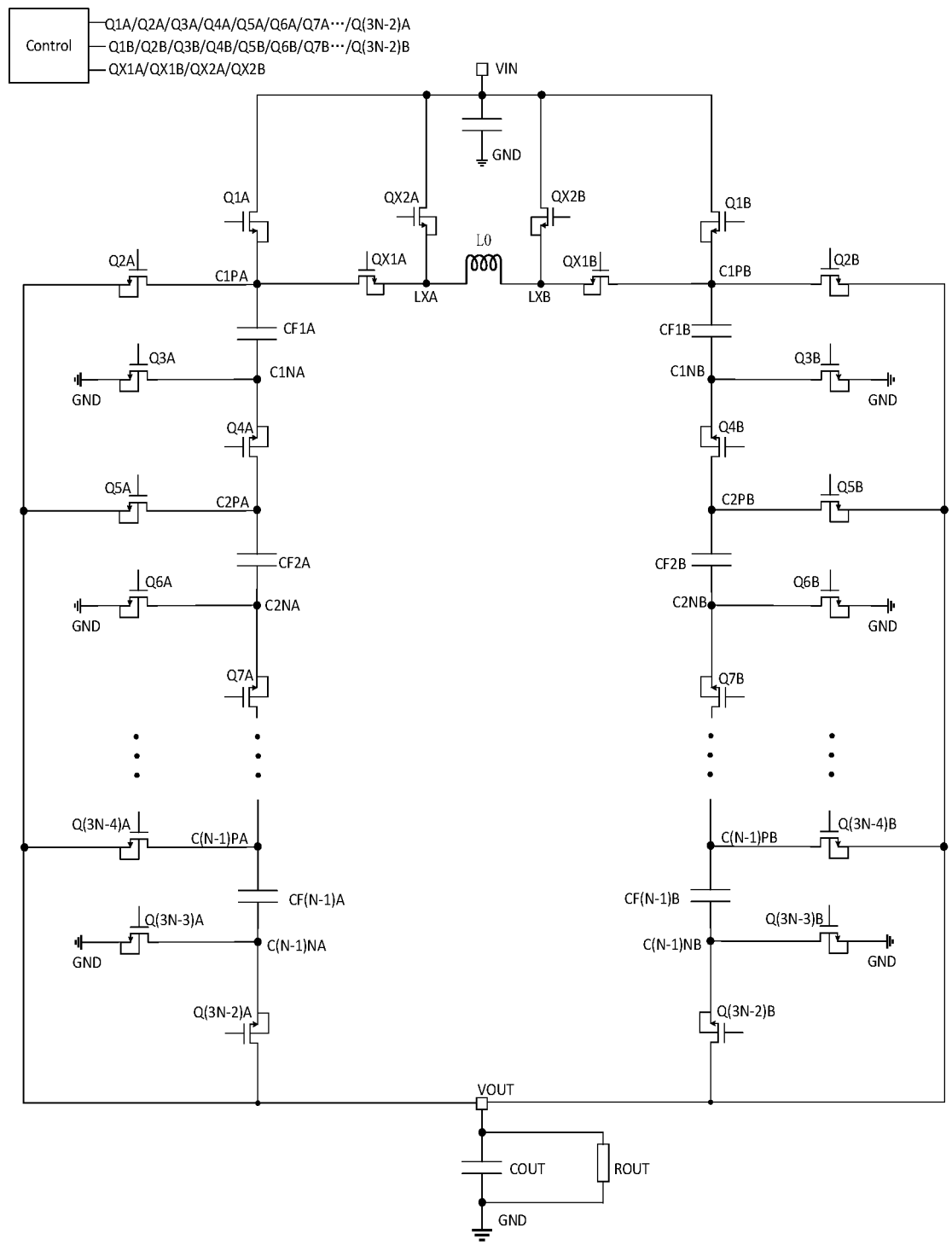
FIG. 18 is a schematic diagram of another circuit structure of another two-branch series-parallel N:1 switched capacitor voltage converter according to an embodiment of the present application.
Figure 19:
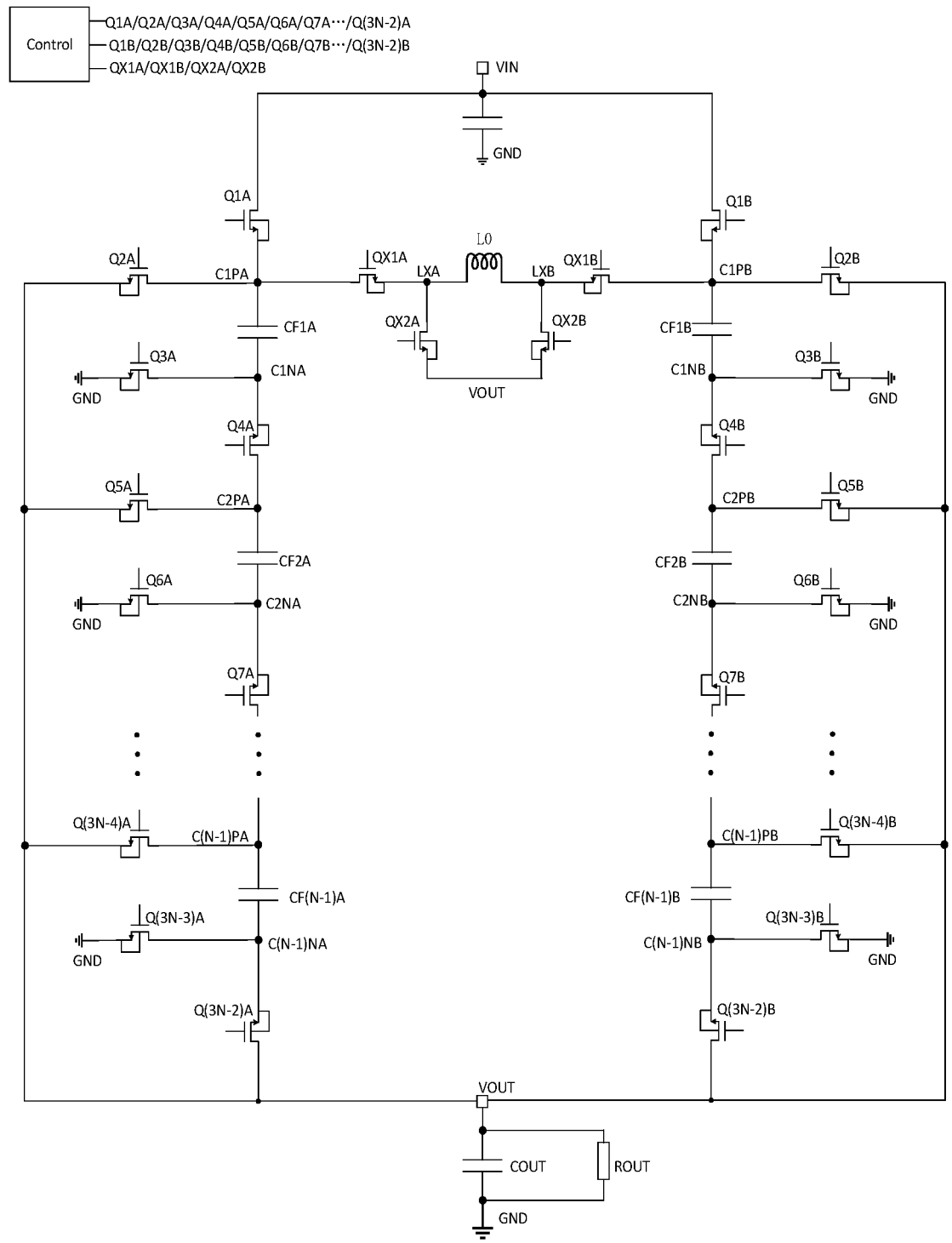
FIG. 19 is a schematic diagram of another circuit structure of another two-branch series-parallel N:1 switched capacitor voltage converter according to an embodiment of the present application.

FIG. 18 shows a circuit of another two-branch series-parallel N:1 switched capacitor voltage converter, the two-branch series-parallel N:1 switched capacitor voltage converter also includes an inductive branch and two branches, and the two branches include a first branch and a second branch. When N=3, the circuit structures of the first branch and the second branch of the two-branch series-parallel N:1 switched capacitor voltage converter of FIG. 18 are same as that of the first branch and the second branch of the two-branch series-parallel 3:1 switched capacitor voltage converter of FIG. 2 respectively. When N is an integer and N≥4, the circuit structures of the first branch and the second branch of the two-branch series-parallel N:1 switched capacitor voltage converter of FIG. 18 are same as that of the first branch and the second branch of the two-branch series-parallel N:1 switched capacitor voltage converter of FIG. 17 respectively. However, the circuit structures of the inductive branch of the two-branch series-parallel N:1 switched capacitor voltage converter of FIG. 18 is different from that of the two-branch series-parallel 3:1 switched capacitor voltage converter of FIG. 2 and the two-branch series-parallel N:1 switched capacitor voltage converter of FIG. 17.

The connection node C1PA of the second terminal of the first switch transistor Q1A, the first terminal of the second switch transistor Q2A and the first terminal of the first capacitor CF1A is connected to the first terminal of the fifteenth switch transistor QX1A, the second terminal of the fifteenth switch transistor QX1A is connected to the first terminal of the sixteenth switch transistor QX2A and the first terminal of the inductor L0, the second terminal of the sixteenth switch transistor QX2A is connected to the input terminal of the two-branch series-parallel N:1 switched capacitor voltage converter.

The connection node C1PB of the second terminal of the eighth switch transistor Q1B, the first terminal of the ninth switch transistor Q2B and the first terminal of the third capacitor CF1B is connected to the second terminal of the eighteenth switch transistor QX1B, the first terminal of the eighteenth switch transistor QX1B is connected to the first terminal of the seventeenth switch transistor QX2B and the second terminal of the inductor L0, and the second terminal of the seventeenth switch transistor QX2B is connected to the input terminal of the two-branch series-parallel N:1 switched capacitor voltage converter.

FIG. 19 shows a circuit of another two-branch series-parallel N:1 switched capacitor voltage converter, the two-branch series-parallel N:1 switched capacitor voltage converter also includes an inductive branch and two branches, and the two branches include a first branch and a second branch. When N=3, the circuit structures of the first branch and the second branch of the two-branch series-parallel N:1 switched capacitor voltage converter of FIG. 19 are as same as that of the first branch and the second branch of the two-branch series-parallel 3:1 switched capacitor voltage converter of FIG. 2 respectively. When N is an integer and N≥4, the circuit structures of the first branch and the second branch of the two-branch series-parallel N:1 switched capacitor voltage converter of FIG. 19 are same as that of the first branch and the second branch of the two-branch series-parallel N:1 switched capacitor voltage converter of FIG. 17 respectively. However, the circuit structures of the inductive branch of the two-branch series-parallel N:1 switched capacitor voltage converter of FIG. 19 is different from that of the two-branch series-parallel 3:1 switched capacitor voltage converter of FIG. 2 and the two-branch series-parallel N:1 switched capacitor voltage converter of FIG. 17.

The connection node C1PA of the second terminal of the first switch transistor Q1A, the first terminal of the second switch transistor Q2A and the first terminal of the first capacitor CF1A when connecting is connected to the first terminal of the fifteenth switch transistor QX1A, the second terminal of the fifteenth switch transistor QX1A is connected to the first terminal of the sixteenth switch transistor QX2A and the first terminal of the inductor L0, the second terminal of the sixteenth switch transistor QX2A is connected to the output terminal of the two-branch series-parallel N:1 switched capacitor voltage converter.

The connection node C1PB of the second terminal of the eighth switch transistor Q1B, the first terminal of the ninth switch transistor Q2B and the first terminal of the third capacitor CF1B when connecting is connected to the second terminal of the eighteenth switch transistor QX1B, the first terminal of the eighteenth switch transistor QX1B is connected to the first terminal of the seventeenth switch transistor QX2B and the second terminal of the inductor L0, and the second terminal of the seventeenth switch transistor QX2B is connected to the output terminal of the two-branch series-parallel N:1 switched capacitor voltage converter.

The control sequence is not limited to the above two sequences, and other control sequences may be used to control the switch transistors to transfer the electric charges on one branch completely to another branch via the inductor within a short period of time when the primary switch transistors are turned off, so that the effect of zero voltage switching is also achieved, thereby improving the conversion efficiency of the series-parallel switched capacitor voltage converter.

In all embodiments of the present application, all switch transistors in the first branch and the second branch are primary switch transistors, and each primary switch transistor has a parasitic capacitor.

Since the specific implementation modes of the circuit structure are various, and the corresponding control methods are also various, they cannot be exemplified one by one in the present application, after those skilled in the art understand the contents of the present application, various modifications, variations or equivalents of the above described examples may be readily conceived, but still be controlled by the limitations set forth in the claims and any equivalents thereof.

What is claimed is:

1. A series-parallel switched capacitor voltage converter, wherein the series-parallel switched capacitor voltage converter is a series-parallel 3:1 switched capacitor voltage converter and comprises an inductive branch and two branches, and the two branches comprise a first branch and a second branch, and an input voltage, upon travelling via the two branches, is converted into another voltage and output;

the inductive branch is connected between the first branch and the second branch, and switch transistors in the first branch and the second branch are primary switch transistors; and the inductive branch is configured to transfer an electric charge or electric charges on a parasitic capacitor of one branch to another branch of the two branches after all the primary switch transistors are turned off;

the first branch comprises a first switch transistor, a second switch transistor, a third switch transistor, a fourth switch transistor, a fifth switch transistor, a sixth switch transistor, a seventh switch transistor, a first capacitor and a second capacitor, and the second branch comprises an eighth switch transistor, a ninth switch transistor, a tenth switch transistor, an eleventh switch transistor, a twelfth switch transistor, a thirteenth switch transistor, a fourteenth switch transistor, a third capacitor and a fourth capacitor;

a first terminal of the first switch transistor and a first terminal of the eighth switch transistor are connected to an input terminal of the series-parallel switched capacitor voltage converter, and the input terminal is connected to an external input voltage, a second terminal of the first switch transistor is connected to a first terminal of the second switch transistor and a first terminal of the first capacitor, and a second terminal of the eighth switch transistor is connected to a first terminal of the ninth switch transistor and a first terminal of the third capacitor;

a second terminal of the first capacitor is connected to a first terminal of the third switch transistor and a first terminal of the fourth switch transistor, and a second terminal of the third capacitor is connected to a first terminal of the tenth switch transistor and a first terminal of the eleventh switch transistor;

a second terminal of the third switch transistor and a second terminal of the tenth switch transistor are grounded, a second terminal of the fourth switch transistor is connected to a first terminal of the fifth switch transistor and a first terminal of the second capacitor, and a second terminal of the eleventh switch transistor is connected to a first terminal of the twelfth switch transistor and a first terminal of the fourth capacitor;

a second terminal of the second capacitor is connected to a first terminal of the sixth switch transistor and a first terminal of the seventh switch transistor, and a second terminal of the fourth capacitor is connected to a first terminal of the thirteenth switch transistor and a first terminal of the fourteenth switch transistor;

a second terminal of the sixth switch transistor and a second terminal of the thirteenth switch transistor are grounded; and a second terminal of the second switch transistor, a second terminal of the fifth switch transistor, a second terminal of the seventh switch transistor, a second terminal of the ninth switch transistor, a second terminal of the twelfth switch transistor and a second terminal of the fourteenth switch transistor are connected to an output terminal of the series-parallel switched capacitor voltage converter.

2. The series-parallel switched capacitor voltage converter according to claim 1, wherein the inductive branch comprises a fifteenth switch transistor, a sixteenth switch transistor, a seventeenth switch transistor, an eighteenth switch transistor and an inductor;

the second terminal of the first capacitor, the first terminal of the third switch transistor and the first terminal of the fourth switch transistor are connected to a first connection node, and the second terminal of the third capacitor, the first terminal of the tenth switch transistor and the first terminal of the eleventh switch transistor are connected to a second connection node, and a first terminal of the fifteenth switch transistor is connected to the first connection node, a second terminal of the fifteenth switch transistor is connected to a first terminal of the sixteenth switch transistor and a first terminal of the inductor, and a second terminal of the sixteenth switch transistor is grounded; and a second terminal of the inductor is connected to a first terminal of the seventeenth switch transistor and a first terminal of the eighteenth switch transistor, a second terminal of the seventeenth switch transistor is grounded, and a second terminal of the eighteenth switch transistor is connected to the second connection node.

3. The series-parallel switched capacitor voltage converter according to claim 2, wherein a working cycle of the series-parallel switched capacitor voltage converter comprises six phases in sequence as follows:

a first phase: the first switch transistor, the fourth switch transistor, the seventh switch transistor, the ninth switch transistor, the tenth switch transistor, the twelfth switch transistor, the thirteenth switch transistor, the sixteenth switch transistor and the eighteenth switch transistor are turned on, and remaining switch transistors are turned off; wherein the input voltage is connected to the output terminal via the first capacitor and the second capacitor respectively, and the third capacitor and the fourth capacitor are connected in parallel between the output terminal and the ground, and the second connection node is connected to the ground via the eighteenth switch transistor, the inductor and the sixteenth switch transistor respectively, and a current on the inductor is 0;

a second phase: the fourth switch transistor, the fifteenth switch transistor and the eighteenth switch transistor are turned on, and remaining switch transistors are turned off; and the first connection node and the second connection node are connected via the fifteenth switch transistor, the inductor and the eighteenth switch transistor respectively, and the current on the inductor continuously increases until to a maximum value, and the second phase ends when the current on the inductor increases to the maximum value;

a third phase: the fifteenth switch transistor and the eighteenth switch transistor are turned on, and remaining switch transistors are turned off, the first connection node and the second connection node are connected via the fifteenth switch transistor, the inductor and the eighteenth switch transistor respectively, and the current on the inductor continuously decreases until to 0, and the third phase ends when the current on the inductor decreases to 0;

a fourth phase: the second switch transistor, the third switch transistor, the fifth switch transistor, the sixth switch transistor, the eighth switch transistor, the eleventh switch transistor, the fourteenth switch transistor, the fifteenth switch transistor and the seventeenth switch transistor are turned on, and remaining switch transistors are turned off; and the first capacitor and the second capacitor are connected in parallel between the output terminal and the ground, the input voltage is connected to the output terminal via the third capacitor and the fourth capacitor respectively, the first connection node is connected to the ground via the fifteenth switch transistor, the inductor and the seventeenth switch transistor respectively, and the current on the inductor is 0;

a fifth phase: the eleventh switch transistor, the fifteenth switch transistor and the eighteenth switch transistor are turned on, and remaining switch transistors are turned off, the first connection node and the second connection node are connected via the fifteenth switch transistor, the inductor and the eighteenth switch transistor respectively, the current on the inductor continuously increases until to the maximum value, and the fifth phase ends when the current on the inductor increases to the maximum value; and a sixth phase: the fifteenth switch transistor and the eighteenth switch transistor are turned on, and remaining switch transistors are turned off, the first connection node and the second connection node are connected via the fifteenth switch transistor, the inductor and the eighteenth switch transistor respectively, the current on the inductor continuously decreases until to 0, and the sixth phase ends and the first phase is started when the current on the inductor decreases to 0.

4. The series-parallel switched capacitor voltage converter according to claim 2, wherein a working cycle of the series-parallel switched capacitor voltage converter comprises six phases in sequence as follows:

a first phase: the first switch transistor, the fourth switch transistor, the seventh switch transistor, the ninth switch transistor, the tenth switch transistor, the twelfth switch transistor, the thirteenth switch transistor, the sixteenth switch transistor and the seventeenth switch transistor are turned on, and remaining switch transistors are turned off, and the input voltage is connected to the output terminal via the first capacitor and the second capacitor in series, the third capacitor and the fourth capacitor are connected in parallel between the output terminal and a ground, and both terminals of the inductor are connected to the ground via the sixteenth switch transistor and the seventeenth switch transistor respectively, and a current on the inductor is 0;

a second phase: the fourth switch transistor, the fifteenth switch transistor and the eighteenth switch transistor are turned on, and remaining switch transistors are turned off, the first connection node and the second connection node are connected via the fifteenth switch transistor, the inductor and the eighteenth switch transistor respectively, the current on the inductor continuously increases until to a maximum value, and the second phase ends when the current on the inductor increases to the maximum value;

a third phase: the fifteenth switch transistor and the eighteenth switch transistor are turned on, and remaining switch transistors are turned off; the first connection node and the second connection node are connected via the fifteenth switch transistor, the inductor and the eighteenth switch transistor respectively, the current on the inductor continuously decreases until to 0, and the third phase ends when the current on the inductor decreases to 0;

a fourth phase: the second switch transistor, the third switch transistor, the fifth switch transistor, the sixth switch transistor, the eighth switch transistor, the eleventh switch transistor, the fourteenth switch transistor, the sixteenth switch transistor and the seventeenth switch transistor are turned on, and remaining switch transistors are turned off; and the first capacitor and the second capacitor are connected in parallel between the output terminal and the ground, the input voltage is connected to the output terminal via the third capacitor and the fourth capacitor in series, both terminals of the inductor are connected to the ground via the sixteenth switch transistor and the seventeenth switch transistor respectively, and the current on the inductor is 0;

a fifth phase: the eleventh switch transistor, the fifteenth switch transistor and the eighteenth switch transistor are turned on, and remaining switch transistors are turned off; the first connection node and the second connection node are connected via the fifteenth switch transistor, the inductor and the eighteenth switch transistor respectively, the current on the inductor continuously increases until to the maximum value, and the fifth phase ends when the current on the inductor increases to the maximum value; and a sixth phase: the fifteenth switch transistor and the eighteenth switch transistor are turned on, and remaining switch transistors are turned off; the first connection node and the second connection node are connected via the fifteenth switch transistor, the inductor and the eighteenth switch transistor respectively, the current on the inductor continuously decreases until to 0, and the sixth phase ends and the first phase starts when the current on the inductor decreases to 0.

5. The series-parallel switched capacitor voltage converter according to claim 1, wherein the inductive branch comprises a fifteenth switch transistor, a sixteenth switch transistor, a seventeenth switch transistor, an eighteenth switch transistor and an inductor;

the second terminal of the first switch transistor, the first terminal of the second switch transistor and the first terminal of the first capacitor are connected to a first terminal of the fifteenth switch transistor, a second terminal of the fifteenth switch transistor is connected to a first terminal of the sixteenth switch transistor and a first terminal of the inductor, and a second terminal of the sixteenth switch transistor is connected to the input terminal of the series-parallel switched capacitor voltage converter; and the second terminal of the eighth switch transistor, the first terminal of the ninth switch transistor and the first terminal of the third capacitor are connected to a second terminal of the eighteenth switch transistor, a first terminal of the eighteenth switch transistor is connected to a first terminal of the seventeenth switch transistor and a second terminal of the inductor, and a second terminal of the seventeenth switch transistor is connected to the input terminal of the series-parallel switched capacitor voltage converter.

6. The series-parallel switched capacitor voltage converter according to claim 1, wherein the inductive branch comprises a fifteenth switch transistor, a sixteenth switch transistor, a seventeenth switch transistor, an eighteenth switch transistor and an inductor;

the second terminal of the first switch transistor, the first terminal of the second switch transistor and the first terminal of the first capacitor are connected to a first terminal of the fifteenth switch transistor, a second terminal of the fifteenth switch transistor is connected to a first terminal of the sixteenth switch transistor and a first terminal of the inductor, and a second terminal of the sixteenth switch transistor is connected to the output terminal of the series-parallel switched capacitor voltage converter; and the second terminal of the eighth switch transistor, the first terminal of the ninth switch transistor and the first terminal of the third capacitor are connected to a second terminal of the eighteenth switch transistor, a first terminal of the eighteenth switch transistor is connected to a first terminal of the seventeenth switch transistor and a second terminal of the inductor, and a second terminal of the seventeenth switch transistor is connected to the output terminal of the series-parallel switched capacitor voltage converter.

7. A series-parallel switched capacitor voltage converter, wherein the series-parallel switched capacitor voltage converter is a series-parallel N:1 switched capacitor voltage converter and comprises an inductive branch and two branches, N is an integer greater than or equal to 4, and the two branches comprise a first branch and a second branch, and an input voltage, upon travelling via the two branches, is converted into another voltage and output;

the inductive branch is connected between the first branch and the second branch, and switch transistors in the first branch and the second branch are primary switch transistors; and the inductive branch is configured to transfer an electric charge or electric charges on a parasitic capacitor of one branch to another branch of the two branches after all the primary switch transistors are turned off;

the first branch comprises a first switch transistor and N−1 first basic units, a first terminal of the first switch transistor is an input terminal of the two-branch series-parallel N:1 switched capacitor voltage converter, the input terminal of the two-branch series-parallel N:1 switched capacitor voltage converter is connected to an external input voltage, a second terminal of the first switch transistor is connected to an output terminal of the two-branch series-parallel N:1 switched capacitor voltage converter through the N−1 first basic units in turn;

each of the N−1 first basic units comprises an input terminal, a first output terminal and a second output terminal, the second terminal of the first switch transistor is connected to an input terminal of the 1th first basic unit, a first output terminal of each first basic unit is connected an input terminal of a next first basic unit, and a first output terminal of a last first basic unit and respective second output terminals of all the N−1 first basic units are connected to the output terminal of the two-branch series-parallel N:1 switched capacitor voltage converter;

the second branch comprises an eighth switch transistor and N−1 second basic units, a first terminal of the eighth switch transistor is the input terminal of the two-branch series-parallel N:1 switched capacitor voltage converter, a second terminal of the eighth switch transistor is connected to the output terminal of the two-branch series-parallel N:1 switched capacitor voltage converter through the N−1 second basic units in turn; and each of the N−1 second basic units comprises an input terminal, a first output terminal and a second output terminal, the second terminal of the eighth switch transistor is connected to an input terminal of the 1th second basic unit, a first output terminal of each second basic unit is connected an input terminal of a next second basic unit, and a first output terminal of a last second basic unit and respective second output terminals of all the N−1 second basic units are connected to the output terminal of the two-branch series-parallel N:1 switched capacitor voltage converter.

8. The series-parallel switched capacitor voltage converter according to claim 7, wherein the each first basic unit comprises a first sub-capacitor, a first sub-switch transistor, a second sub-switch transistor and a third sub-switch transistor, a first terminal of the first sub-capacitor is connected to a first terminal of the first sub-switch transistor, the first terminal of the first sub-capacitor is an input terminal of the first basic unit, and a second terminal of the first sub-switch transistor is a second output terminal of the first basic unit, a second terminal of the first sub-capacitor is connected to a first terminal of the second sub-switch transistor and a first terminal of the third sub-switch transistor, a second terminal of the second sub-switch transistor is connected to the ground, and a second terminal of the third sub-switch transistor is a first output terminal of the first basic unit; and each second basic unit comprises a second sub-capacitor, a fourth sub-switch transistor, a fifth sub-switch transistor and a sixth sub-switch transistor, a first terminal of the second sub-capacitor is connected to a first terminal of the fourth sub-switch transistor, the first terminal of the second sub-capacitor is an input terminal of the second basic unit, and a second terminal of the fourth sub-switch transistor is a second output terminal of the second basic unit, a second terminal of the second sub-capacitor is connected to a first terminal of the fifth sub-switch transistor and a first terminal of the sixth sub-switch transistor, a second terminal of the fifth sub-switch transistor is connected to the ground, and a second terminal of the sixth sub-switch transistor is a first output terminal of the second basic unit.

9. The series-parallel switched capacitor voltage converter according to claim 7, wherein the inductive branch comprises a fifteenth switch transistor, a sixteenth switch transistor, a seventeenth switch transistor, an eighteenth switch transistor and an inductor;

the 1th first basic unit comprises a first capacitor, a second switch transistor, a third switch transistor, and a fourth switch transistor, the second terminal of the first switch transistor is connected to a first terminal of the second switch transistor and a first terminal of the first capacitor, a second terminal of the second switch transistor is a second output terminal of the 1th first basic unit, a second terminal of the first capacitor is connected to a first terminal of the third switch transistor and a first terminal of the fourth switch transistor, a second terminal of the third switch transistor is grounded, and a second terminal of the fourth switch transistor is a first output terminal of the 1th first basic unit;

the 1th second basic unit comprises a third capacitor, a ninth switch transistor, a tenth switch transistor, and an eleventh switch transistor, the second terminal of the eighth switch transistor is connected to a first terminal of the ninth switch transistor and a first terminal of the third capacitor, a second terminal of the ninth switch transistor is a second output terminal of the 1th second basic unit, a second terminal of the third capacitor is connected to a first terminal of the tenth switch transistor and a first terminal of the eleventh switch transistor, a second terminal of the tenth switch transistor is grounded, and a second terminal of the eleventh switch transistor is a first output terminal of the 1th second basic unit;

the second terminal of the first capacitor, the first terminal of the third switch transistor and the first terminal of the fourth switch transistor are connected to a first connection node, and the second terminal of the third capacitor, the first terminal of the tenth switch transistor and the first terminal of the eleventh switch transistor are connected to a second connection node, and a first terminal of the fifteenth switch transistor is connected to the first connection node, a second terminal of the fifteenth switch transistor is connected to a first terminal of the sixteenth switch transistor and a first terminal of the inductor, and a second terminal of the sixteenth switch transistor is grounded; and a second terminal of the inductor is connected to a first terminal of the seventeenth switch transistor and a first terminal of the eighteenth switch transistor, a second terminal of the seventeenth switch transistor is grounded, and a second terminal of the eighteenth switch transistor is connected to the second connection node.

10. The series-parallel switched capacitor voltage converter according to claim 7, wherein the inductive branch comprises a fifteenth switch transistor, a sixteenth switch transistor, a seventeenth switch transistor, an eighteenth switch transistor and an inductor;

the 1th first basic unit comprises a first capacitor, a second switch transistor, a third switch transistor, and a fourth switch transistor, the second terminal of the first switch transistor is connected to a first terminal of the second switch transistor and a first terminal of the first capacitor, a second terminal of the second switch transistor is a second output terminal of the 1th first basic unit, a second terminal of the first capacitor is connected to a first terminal of the third switch transistor and a first terminal of the fourth switch transistor, a second terminal of the third switch transistor is grounded, and a second terminal of the fourth switch transistor is a first output terminal of the 1th first basic unit;

the 1th second basic unit comprises a third capacitor, a ninth switch transistor, a tenth switch transistor, and an eleventh switch transistor, the second terminal of the eighth switch transistor is connected to a first terminal of the ninth switch transistor and a first terminal of the third capacitor, a second terminal of the ninth switch transistor is a second output terminal of the 1th second basic unit, a second terminal of the third capacitor is connected to a first terminal of the tenth switch transistor and a first terminal of the eleventh switch transistor, a second terminal of the tenth switch transistor is grounded, and a second terminal of the eleventh switch transistor is a first output terminal of the 1th second basic unit;

the second terminal of the first switch transistor, the first terminal of the second switch transistor and the first terminal of the first capacitor are connected to a first terminal of the fifteenth switch transistor, a second terminal of the fifteenth switch transistor is connected to a first terminal of the sixteenth switch transistor and a first terminal of the inductor, and a second terminal of the sixteenth switch transistor is connected to the input terminal of the series-parallel switched capacitor voltage; and the second terminal of the eighth switch transistor, the first terminal of the ninth switch transistor and the first terminal of the third capacitor are connected to a second terminal of the eighteenth switch transistor, a first terminal of the eighteenth switch transistor is connected to a first terminal of the seventeenth switch transistor and a second terminal of the inductor, and a second terminal of the seventeenth switch transistor is connected to the input terminal of the series-parallel switched capacitor voltage.

11. The series-parallel switched capacitor voltage converter according to claim 7, wherein the inductive branch comprises a fifteenth switch transistor, a sixteenth switch transistor, a seventeenth switch transistor, an eighteenth switch transistor and an inductor;

the 1th first basic unit comprises a first capacitor, a second switch transistor, a third switch transistor, and a fourth switch transistor, the second terminal of the first switch transistor is connected to a first terminal of the second switch transistor and a first terminal of the first capacitor, a second terminal of the second switch transistor is a second output terminal of the 1th first basic unit, a second terminal of the first capacitor is connected to a first terminal of the third switch transistor and a first terminal of the fourth switch transistor, a second terminal of the third switch transistor is grounded, and a second terminal of the fourth switch transistor is a first output terminal of the 1th first basic unit;

the 1th second basic unit comprises a third capacitor, a ninth switch transistor, a tenth switch transistor, and an eleventh switch transistor, the second terminal of the eighth switch transistor is connected to a first terminal of the ninth switch transistor and a first terminal of the third capacitor, a second terminal of the ninth switch transistor is a second output terminal of the 1th second basic unit, a second terminal of the third capacitor is connected to a first terminal of the tenth switch transistor and a first terminal of the eleventh switch transistor, a second terminal of the tenth switch transistor is grounded, and a second terminal of the eleventh switch transistor is a first output terminal of the 1th second basic unit;

the second terminal of the first switch transistor, the first terminal of the second switch transistor and the first terminal of the first capacitor are connected to a first terminal of the fifteenth switch transistor, a second terminal of the fifteenth switch transistor is connected to a first terminal of the sixteenth switch transistor and a first terminal of the inductor, and a second terminal of the sixteenth switch transistor is connected to the output terminal of the series-parallel switched capacitor voltage; and the second terminal of the eighth switch transistor, the first terminal of the ninth switch transistor and the first terminal of the third capacitor are connected to a second terminal of the eighteenth switch transistor, a first terminal of the eighteenth switch transistor is connected to a first terminal of the seventeenth switch transistor and a second terminal of the inductor, and a second terminal of the seventeenth switch transistor is connected to the output terminal of the series-parallel switched capacitor voltage.

* * * * *